(12) United States Patent
Kawabe et al.

(10) Patent No.: US 7,637,603 B2
(45) Date of Patent: Dec. 29, 2009

(54) PIGMENT INK, INK SET, INK JET RECORDING METHOD, INK CARTRIDGE, RECORDING UNIT, INK JET RECORDING APPARATUS, AND IMAGE FORMING METHOD

(75) Inventors: Minako Kawabe, Koganei (JP); Hiroshi Tomioka, Tokyo (JP); Hiroyuki Takuhara, Yaita (JP); Satomi Yanagimachi, Yokosuka (JP); Yuuki Nishino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 11/772,962

(22) Filed: Jul. 3, 2007

(65) Prior Publication Data

US 2008/0136862 A1    Jun. 12, 2008

Related U.S. Application Data

(63) Continuation of application No. PCT/JP2007/055159, filed on Mar. 8, 2007.

(30) Foreign Application Priority Data

Mar. 9, 2006    (JP) ............... 2006-064315

(51) Int. Cl.
  *B41J 2/17*    (2006.01)
(52) U.S. Cl. ........................................ 347/96
(58) Field of Classification Search ............... None
  See application file for complete search history.

(56) References Cited

U.S. PATENT DOCUMENTS

| | | | |
|---|---|---|---|
| 4,723,129 A | 2/1988 | Endo et al. ............. 346/1.1 |
| 4,740,796 A | 4/1988 | Endo et al. ............. 346/1.1 |
| 6,280,513 B1 | 8/2001 | Osumi et al. ............ 106/31.6 |
| 6,332,919 B2 | 12/2001 | Osumi et al. ............ 106/31.6 |
| 6,706,104 B2 | 3/2004 | Takuhara et al. ......... 106/31.6 |
| 6,780,901 B1 | 8/2004 | Endo et al. ............. 523/160 |
| 6,966,944 B2 | 11/2005 | Shimomura et al. ....... 106/31.43 |
| 7,025,817 B2 | 4/2006 | Kanke et al. ............ 106/31.51 |
| 7,208,033 B2 | 4/2007 | Kawabe et al. .......... 106/31.48 |
| 7,229,166 B2 | 6/2007 | Tomioka et al. .......... 347/100 |
| 7,244,299 B2 | 7/2007 | Tsuji et al. ............ 106/31.48 |
| 7,297,194 B2 | 11/2007 | Shinjo et al. ........... 106/31.27 |

(Continued)

FOREIGN PATENT DOCUMENTS

JP    2889817    2/1999

(Continued)

*Primary Examiner*—Stephen D Meier
*Assistant Examiner*—Alexander C Witkowski
(74) *Attorney, Agent, or Firm*—Fitzpatrick, Cella, Harper & Scinto

(57) ABSTRACT

A pigment ink is provided which is used in an ink jet recording apparatus in which ejection orifices for a pigment ink and ejection orifices for at least one type of reactive ink that destabilizes a dispersed state of pigment in the pigment ink are capped with the identical cap provided with a unit for removing an ink in the cap, achieving compatibility between bleeding resistance and reliability. Where a mixed thickening ratio upon mixing the pigment ink and the reactive ink in equal volumes is represented by Y (%) and an ejection orifice-to-ejection orifice distance between the ejection orifice for the pigment ink and the ejection orifice for the reactive ink is represented by X (mm) (provided that X>0), Y and X satisfy a specific relationship.

14 Claims, 10 Drawing Sheets

U.S. PATENT DOCUMENTS

| | | | |
|---|---|---|---|
| 2002/0054187 A1* | 5/2002 | Kato et al. | 347/43 |
| 2005/0088498 A1 | 4/2005 | Parazak et al. | 347/96 |
| 2006/0125895 A1* | 6/2006 | Nito et al. | 347/100 |
| 2006/0152570 A1 | 7/2006 | Ishikawa et al. | 347/105 |
| 2006/0194056 A1 | 8/2006 | Nagashima et al. | 428/403 |
| 2006/0194897 A1 | 8/2006 | Kawabe et al. | 523/160 |

FOREIGN PATENT DOCUMENTS

| | | |
|---|---|---|
| JP | 2000-198955 | 7/2000 |
| JP | 2003-089224 | 3/2003 |
| JP | 3538209 | 3/2004 |
| JP | 2005-161842 | 6/2005 |
| JP | 2006-007455 | 1/2006 |

* cited by examiner

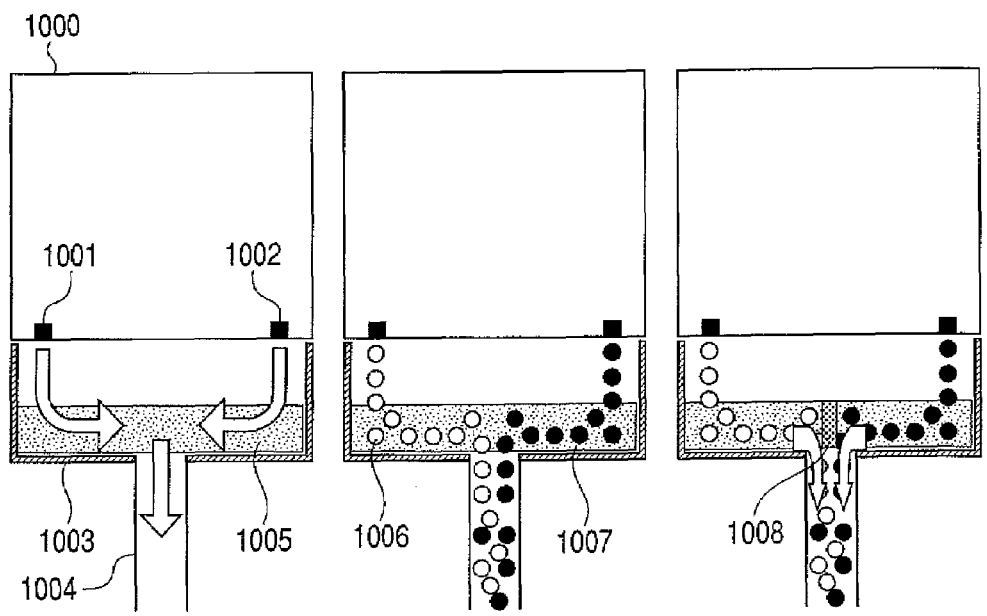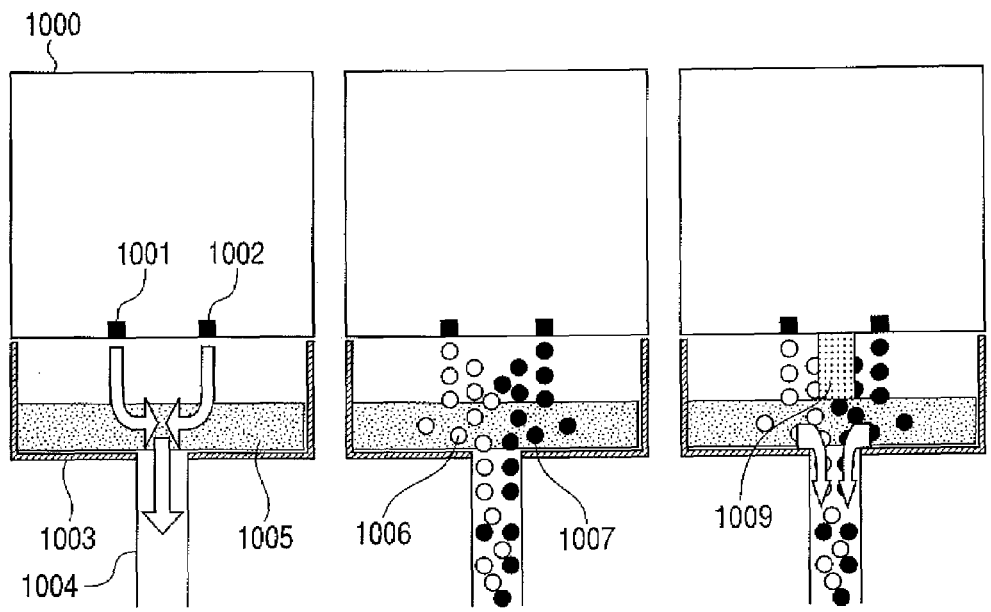

PIGMENT INK, INK SET, INK JET RECORDING METHOD, INK CARTRIDGE, RECORDING UNIT, INK JET RECORDING APPARATUS, AND IMAGE FORMING METHOD

This application is a continuation of International Application No. PCT/JP2007/055159 filed on Mar. 8, 2007, which claims the benefit of Japanese Patent Application No. 2006-064315 filed on Mar. 9, 2006.

BACKGROUND OF THE INVENTION

1. Field of the Invention

The present invention relates to a pigment ink, an ink set, an ink jet recording method, an ink cartridge, a recording unit, an ink jet recording apparatus, and an image forming method.

2. Description of the Related Art

An ink jet recording method is a method of recording an image involving ejecting ink onto a recording medium, and does not require a complicated apparatus, and hence a running cost can be suppressed to a low level, and, for example, a reduction in size of an ink jet recording apparatus and the colorization of images formed by the apparatus can be easily performed. Accordingly, various recording apparatuses employing the ink jet recording method, such as a printer, a copying machine, a facsimile, and a word processor, have been in widespread use.

In such an ink jet recording technique, plural color images are formed by using a black ink and color inks (such as a yellow ink, a cyan ink, a magenta ink, a red ink, a green ink, and a blue ink). An ink containing a pigment as a coloring material has been used as the black ink among those inks for the purpose of, for example, providing an excellent image density and excellent letter quality (see Japanese Patent Application Laid-Open No. 2000-198955).

When plural inks having different hues are applied to a recording medium so as to be adjacent to each other in the ink jet recording method, there is a problem in that a phenomenon (bleeding) occurs in which the plural inks having different hues mix with each other at boundary portions between images formed from the inks. In particular, the occurrence of bleeding at a boundary portion between images formed by a black ink and a color ink has a great influence on deterioration in image quality. In view of the foregoing, various techniques have been developed for obtaining excellent bleeding resistance.

A representative method of solving the problem involves inducing thickening, or agglomeration or precipitation of a coloring material, to at least one type of ink when plural inks having different hues are applied to a recording medium so as to be adjacent to each other, thereby suppressing the occurrence of bleeding. For example, a method is disclosed in which either an anionic ink or a cationic ink is made up to contain a polymer having the same ionicity as the ink, and these inks are applied to a recording medium to come in contact with each other (see Japanese Patent No. 2889817). In addition, a method is disclosed involving applying to a recording medium a first ink and a second ink containing a precipitant that reacts with a coloring material in the first ink to produce precipitate so that the inks are brought into contact with each other (see Japanese Patent No. 3538209). In addition, a polyvalent metal is used as the precipitant.

In recent years, the reliability of the prevention of ink clogging or the stable performance of ink ejection has been requested at a higher level. For example, there is a proposal concerning the prevention of ink clogging caused by agglomerate adhering to a surface having an ejection orifice of a recording head or agglomeration of components in the ink at the time of wiping, when a reactive ink is used. For example, it is disclosed that when recording is performed by using a recording head in which one orifice plate is provided with ejection orifices for plural inks that react with each other, agglomerate produced by a reaction between the inks can be redissolved or redispersed in any one of the inks (see Japanese Patent Application Laid-Open No. 2005-161842).

However, with ink jet recording apparatuses using ink, none of the above-mentioned techniques could sufficiently achieve a high level of reliability that has been requested in recent years.

Further, it has been performed that ink concentrated by evaporation, or agglomerate present near an ink ejection orifice is removed by a sucking operation by using a cap having a sucking mechanism in order that the ink ejection orifice may be capped.

Such techniques for obtaining excellent bleeding resistance as described above have improved image quality. However, in conventional techniques, emphasis has been placed on an efficient reaction between inks, that is, how to improve reactivity between inks for obtaining excellent bleeding resistance, hence sufficient reliability could not be obtained in some cases. In view of the foregoing, in order to solve the problem as described above, the capping of ejection orifices for ejecting plural inks that react with each other with plural caps has been widely performed. However, the use of such plural caps as described above results in an increase in size of an ink jet recording apparatus, the complication of the mechanism of the apparatus and an increase in cost.

In view of the foregoing, the inventors of the present invention have conducted investigation with a view to achieving the acquisition of reliability, a reduction in size of an ink jet recording apparatus and the simplification of the mechanism of the apparatus, and a reduction in cost simultaneously. That is, the inventors have made an investigation into the capping of ejection orifices for a pigment ink and ejection orifices for an ink that reacts with the pigment ink with the identical cap (cap exclusively used when being left standing). As a result, the inventors have found that the above-mentioned constitution, that is, the mere capping of ejection orifices for plural inks that react with each other with the identical cap cannot sufficiently provide a high level of reliability that has been requested in recent years. Further, the inventors have found that other means may be necessary for sufficiently obtaining reliability, and a reduction in size of an ink jet recording apparatus, the simplification of the mechanism of the apparatus, and a reduction in cost cannot be achieved without the means.

The inventors of the present invention have conducted research on the capping of ejection orifices for plural inks that react with each other with one cap having a sucking mechanism disclosed in Japanese Patent Nos. 2889817 and 3538209, and Japanese Patent Application Laid-Open No. 2005-161842. As a result, the inventors of the present invention have found that when performing a sucking operation, the plural inks that react with each other come in contact with each other to produce agglomerate, and the agglomerate adheres to a recording head, with the result that reliability deteriorates.

Therefore, the first object of the present invention is to provide a pigment ink for use in an ink jet recording apparatus in which an ejection orifice for the pigment ink and an ejection orifice for an ink that reacts with the pigment ink are capped with the same cap, the pigment ink achieving the compatibility between bleeding resistance and reliability.

Further, the second object of the present invention is, in addition to attaining the above-mentioned first object of the present invention, to provide a pigment ink capable of providing excellent image quality.

In recent years, in an ink jet recording method, in order that additionally excellent image quality may be obtained, a method has been performed in which an image having a width equal to the length of a recording head is scanned twice or more with a recording head in the main scanning direction in a bi-directional manner to be recorded (hereinafter referred to as "multi-pass recording"). However, when the multi-pass recording is performed, increasing the number of nozzles, or lengthening the recording head may be unable to shorten a recording time sufficiently. In view of the foregoing, a method of performing recording in both the forward and backward directions of main scanning (hereinafter referred to as "bi-directional recording"), or a method of recording an image having a width equal to the length of a recording head by one main scanning (hereinafter referred to as "one-pass recording") has been attempted to shorten a recording time. When performing recording by combining the one-pass recording and the bi-directional recording, i.e., performing one-pass, bi-directional recording, there is no need to scan multiple times one site on a recording medium, and a recording time can be largely shortened. However, as a result of the investigation conducted by the inventors of the present invention, it has been found that performing recording at a high speed as in the case of the one-pass, bi-directional recording involves the remarkable occurrence of bi-directional unevenness when a pigment ink and an ink that reacts with the pigment ink are applied to a recording medium so as to overlap each other.

Therefore, the third object of the present invention is, in addition to attain the above-mentioned first and second objects of the present invention, to provide a pigment ink capable of suppressing the occurrence of bi-directional unevenness in image formation by bi-directional recording.

In addition, another object of the present invention is to provide an ink set, an ink jet recording method, an ink cartridge, a recording unit, an ink jet recording apparatus and an image forming method which use the above pigment ink.

SUMMARY OF THE INVENTION

The above-mentioned objects of the present invention can be attained by the present invention described below.

That is, according to the first object of the present invention, a pigment ink is provided which is used in an ink jet recording apparatus in which ejection orifices for a pigment ink and ejection orifices for at least one type of reactive ink that destabilizes a dispersed state of pigment in the pigment ink are capped with the identical cap provided with a removing unit for removing an ink in the cap, and wherein, when a mixed thickening ratio upon mixing the pigment ink and the reactive ink in equal volumes is represented by Y (%) and an ejection orifice-to-ejection orifice distance between the ejection orifice for the pigment ink and the ejection orifice for the reactive ink is represented by X (mm) provided that X>0, Y and X in the pigment ink and the reactive ink the ejection orifices for which are capped with the identical cap satisfy a relationship represented by the following expression (A):

$$Y \leq 0.60X + 50.0 \tag{A}$$

The pigment ink according to the second object of the present invention is, in the pigment ink having the above-mentioned constitution, characterized in that the reactive ink include plural reactive inks different from each other in mixed thickening ratio; and the ejection orifice for the pigment ink and an ejection orifice for a reactive ink having a smallest mixed thickening ratio of the plural reactive inks different from each other in mixed thickening ratio are capped with the identical cap.

The pigment ink according to the third object of the present invention is, in the pigment ink having the above-mentioned constitution, characterized in that at least one type of reactive ink of the plural reactive inks different from each other in mixed thickening ratio has the same hue as at least one type of pigment ink, and the other reactive inks have hues different from the at least one type of pigment ink, and further, the pigment ink is used together with an ink having a hue different from the at least one type of pigment ink and the reactive inks different from each other in mixed thickening ratio.

Further, an ink set according to another embodiment of the present invention includes a plurality of inks, wherein the inks include the pigment ink and the reactive ink which have the above-mentioned constitution.

Furthermore, an ink jet recording method according to another embodiment of the present invention includes ejecting an ink by an ink jet method to perform recording, wherein the ink includes the pigment ink having the above-mentioned constitution.

Furthermore, an ink cartridge according to another embodiment of the present invention includes an ink storage portion for storing an ink, wherein the ink includes the pigment ink having the above-mentioned constitution.

Furthermore, a recording unit according to another embodiment of the present invention includes ink storage portions for storing inks and a recording head for ejecting the inks, wherein each of the inks includes a pigment ink and at least one type of reactive ink that destabilizes a dispersed state of pigment in the pigment ink, and ejection orifices for the pigment ink and ejection orifices for the reactive ink are capped with the identical cap provided with a removing unit for removing an ink in the cap, and when a mixed thickening ratio upon mixing the pigment ink and the reactive ink in equal volumes is represented by Y (%) and an ejection orifice-to-ejection orifice distance between the ejection orifice for the pigment ink and the ejection orifice for the reactive ink is represented by X (mm) provided that X>0, Y and X in the pigment ink and the reactive ink the ejection orifices for which are capped with the identical cap satisfy a relationship represented by the following expression (A):

$$Y \leq 0.60X + 50.0 \tag{A}$$

Further, an ink jet recording apparatus according to another embodiment of the present invention, in which an ejection orifice for a pigment ink and an ejection orifice for at least one kind of reactive ink that destabilizes a dispersed state of a pigment in the pigment ink are capped with the identical cap, and the cap includes a removing unit for removing an ink in the cap, is characterized in that when a mixed thickening ratio in a case of mixing the pigment ink and the reactive inks in equal volumes is represented by Y (%) and an ejection orifice-to-ejection orifice distance between the ejection orifice for the pigment ink and the ejection orifice for the reactive ink is represented by X (mm) provided that X>0, Y and X in the pigment ink and the reactive ink the ejection orifices for which are capped with the identical cap satisfy a relationship represented by the following expression (A):

$$Y \leq 0.60X + 50.0 \tag{A}$$

Further, an image forming method according to another embodiment of the present invention includes performing recording by using a pigment ink and at least one type of reactive ink that destabilizes a dispersed state of pigment in the pigment ink according to an ink jet recording method, wherein the pigment ink having the above-mentioned constitution is used as the pigment ink, and an image is formed including an image formed from the pigment ink and an image formed from said at least one kind of the reactive ink which are adjacent to each other.

Further, an image forming method according to another embodiment of the present invention includes ejecting a pigment ink, ejecting at least one kind of reactive ink that destabilizes a dispersed state of pigment in the pigment ink and capping ejection orifices for the pigment ink and ejection orifices for the reactive ink with the identical cap to remove ink in the cap, wherein, when a mixed thickening ratio upon mixing the pigment ink and the reactive ink in equal volumes is represented by Y (%) and an ejection orifice-to-ejection orifice distance between the ejection orifice for the pigment ink and the ejection orifice for the reactive ink is represented by X (mm) provided that X>0, Y and X in the pigment ink and the reactive ink the ejection orifices for which are capped with the identical cap satisfy a relationship represented by the following expression (A):

$$Y \leq 0.60X + 50.0 \quad (A).$$

According to the first invention aimed at the first object of the present invention, a pigment ink can be provided which is used in an ink jet recording apparatus in which ejection orifices for the pigment ink and ejection orifices for an ink that reacts with the pigment ink are capped with the identical cap, achieving compatibility between image quality and reliability.

According to the second invention aimed at the second object of the present invention, a pigment ink can be provided which is capable of providing excellent image quality in addition to attaining the first object of the present invention.

According to the third invention aimed at the third object of the present invention, a pigment ink can be provided which is capable of reducing the occurrence of bi-directional unevenness in image formation by bi-directional recording in addition to attaining the first and second objects of the present invention.

According to another embodiments of the present invention, an ink set, an ink jet recording method, an ink cartridge, a recording unit, an ink jet recording apparatus, and an image forming method can be provided using the above-mentioned pigment ink.

Further features of the present invention will become apparent from the following description of exemplary embodiments with reference to the attached drawings.

BRIEF DESCRIPTION OF THE DRAWINGS

FIGS. 1A, 1B, and 1C are schematic views showing a recording head part and a sucking part where the mixed thickening ratio Y and the ejection orifice-to-ejection orifice distance X satisfy the relationship represented by the expression (A).

FIGS. 2A, 2B, and 2C are schematic views showing the recording head part and the sucking part where the mixed thickening ratio Y and the ejection orifice-to-ejection orifice distance X do not satisfy the relationship represented by the expression (A).

DESCRIPTION OF THE EMBODIMENTS

Figure 3:
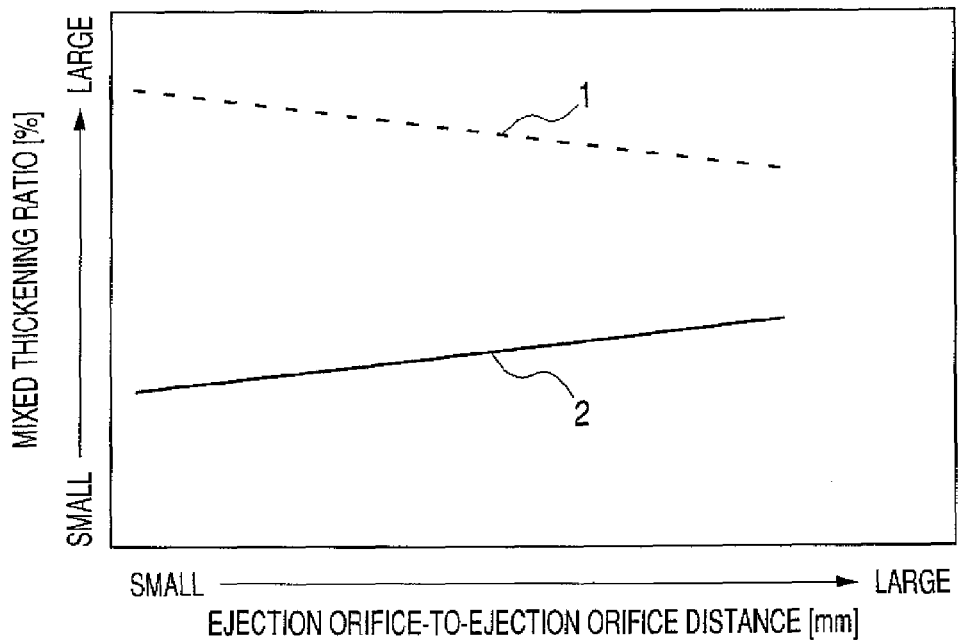
FIG. 3 is a graph showing a region where image quality can be obtained and a region where reliability can be obtained (when the identical cap is used) in a conventional way of thinking.

The present invention will be described below in detail by way of preferred embodiments.

In the present invention, when a coloring material is a salt, the salt is dissociated into ions in ink, but this state is represented by using the phrase "containing a salt" for convenience.

It has been conventionally possible to obtain excellent image quality by using a plurality of inks that react with each other. However, it has been difficult to achieve compatibility between reliability with which ejection orifices for the inks that react with each other can be capped with the identical cap and image quality. In particular, when the cap doubles as a mechanism for sucking an ink (the so-called suction recovery mechanism) as a removing unit for removing an ink, it has been thought impossible to cap ejection orifices for ejecting the inks that react with each other with the identical cap.

In view of the foregoing, the inventors of the present invention have conducted investigation with a view to achieving compatibility between image quality and reliability. As a result, the inventors have found that compatibility between image quality and reliability can be achieved by establishing the specific relationship of reactivity between a pigment ink and an ink that reacts with the pigment ink with the shortest distance between ejection orifices for the respective inks (ejection orifice-to-ejection orifice distance). Consequently, the inventors have made the first invention aimed at the first object of the present invention.

As a result of further investigation conducted by the inventors of the present invention, it has been found that excellent image quality as well as the above-mentioned effect can be obtained by specifying the ejection orifice-to-ejection orifice distance between an ejection orifice for a pigment ink and an ejection orifice for each reactive ink that reacts with the pigment ink. Thus, the inventors have completed the second invention aimed at the second object of the present invention.

In addition, as a result of further investigation conducted by the inventors of the present invention, it has been found that the occurrence of bi-directional unevenness in image formation by bi-directional recording can be suppressed by specifying the order in which ejection orifices for inks are arranged and the hue of an ink. Thus, the inventors have completed the third invention aimed at the third object of the present invention. The term "bi-directional unevenness" refers to color unevenness caused by the difference in the order in which inks are applied between forward recording and backward recording when recording is performed by an ink jet recording method in which the forward recording and the backward recording are different from each other in the order in which inks are applied.

(Relationship Between Pigment Ink and Reactive Ink)

A pigment ink according to the present invention is used together with a reactive ink that destabilizes the dispersed state of a pigment in the pigment ink (hereinafter simply referred to also as "reactive ink"). The reactive ink preferably contains a component that destabilizes the dispersed state of the pigment. In the present invention, for example, a dye that destabilizes the dispersed state of the pigment or a reactive component that destabilizes the dispersed state of the pigment can be used as the component that destabilizes the dispersed state of the pigment.

The pigment ink according to the present invention is characterized in that, when a mixed thickening ratio is represented by Y (%) and an ejection orifice-to-ejection orifice distance is represented by X (mm) (provided that X>0), Y and X in the pigment ink and reactive ink the ejection orifices for which are capped with the identical cap satisfy such a relationship as represented by the following expression (A). The details of the mixed thickening ratio Y (%) and the ejection orifice-to-ejection orifice distance X (mm) will be described later.

$$Y \leq 0.60X + 50.0 \quad (A)$$

In addition, the pigment ink according to another embodiment of the present invention is characterized in that Y and X described above in the pigment ink and the reactive ink the ejection orifices for which are capped with the identical cap additionally satisfy the relationships represented by the following expressions (1) and (2):

$$X \geq 1.5 \quad (1)$$

$$Y \geq 2.1X + 10.0 \quad (2).$$

In the present invention, the mixed thickening ratio Y and the ejection orifice-to-ejection orifice distance X are used. It will be explained below why both image quality and reliability can be made excellent by satisfying the specific relationship between the mixed thickening ratio Y and the ejection orifice-to-ejection orifice distance X when the pigment ink and the reactive ink that destabilizes the dispersed state of the pigment in the pigment ink are used.

(Mixed Thickening Ratio Y)

Image quality in an image formed by using the pigment ink and the reactive ink is related to how strongly the pigment ink and the reactive ink react with each other. The term "react" as used herein refers to destabilizing the dispersed state of the pigment in the pigment ink when the pigment ink and the reactive ink contact with each other to be mixed. To be specific, the term means the occurrence of a phenomenon such as the agglomeration or precipitation of the pigment, or the thickening of the pigment ink.

In the present invention, reactivity between the pigment ink and the reactive ink is represented by using a mixed thickening ratio to be described below.

The mixed thickening ratio refers to a ratio at which the viscosity of a mixture containing the pigment ink and the reactive ink in equal volumes increases as compared with the average viscosity of the pigment ink and the reactive ink, and is represented in a "%" unit. For example, when two types of inks that react with each other are defined as Ink A and Ink B, a mixed thickening ratio is calculated from the viscosity of a mixed ink and the average viscosity of Ink A and Ink B on the basis of the following equation. The term "viscosity of a mixed ink" refers to the viscosity of a liquid (mixed ink) prepared by: mixing Ink A and Ink B whose volumes are equal; and stirring the mixture for 30 minutes. In addition, the term "average viscosity of Ink A and Ink B" refers to a value obtained by dividing the sum of values of the viscosities of Ink A and Ink B by the number of inks (2 in this case). In the present invention, viscosity was measured with a VISCONIC ED type (manufactured by Tokyo Keiki Co., Ltd.) under the condition that temperature is 25° C.

Mixed thickening ratio [%]=[(Viscosity of mixed ink−Average viscosity of Ink $A$ and Ink $B$)/(Average viscosity of Ink $A$ and Ink $B$)]×100

The mixed thickening ratio represents the degree of the reactivity between the pigment ink and the reactive ink. The larger the value of the mixed thickening ratio, the higher the reactivity between the pigment ink and the reactive ink is. In addition, the larger the value of the mixed thickening ratio, the larger the amount of agglomerate or precipitate generated by the mixing of the pigment ink and the reactive ink. The agglomerate or precipitate largely affects reliability. For example, when an ink jet recording apparatus has a unit for removing an ink in the cap, reliability cannot be obtained owing to an influence of the agglomerate or precipitate generated by the reaction between the pigment ink and the reactive ink in the cap in some cases. In addition, a constitution needed for removing an ink in the cap, i.e., a tube, a pump, a member for holding a waste ink, etc., undergoes the impairment of its role owing to an influence of the agglomerate or precipitate generated by the reaction between the pigment ink and the reactive ink, thus reliability cannot be obtained in some cases. The mixed thickening ratio Y (%) takes a value more than 0 because the ratio is a value in a plurality of inks that react with each other. In the present invention, the lower limit of the mixed thickening ratio Y is preferably 10% or more, more preferably 13% or more, or particularly preferably 18% or more. If the lower limit of the mixed thickening ratio Y is less than 10%, the reactivity between the pigment ink and the reactive ink is low, and an improving effect on image quality such as bleeding resistance cannot be obtained in some cases. In addition, the upper limit of the mixed thickening ratio Y is preferably 70% or less, more preferably 66% or less, or particularly preferably 60% or less. If the upper limit of the mixed thickening ratio Y is higher than 70%, sufficient reliability cannot be obtained in some cases.

(Ejection Orifice-to-Ejection Orifice Distance X)

Figure 15:
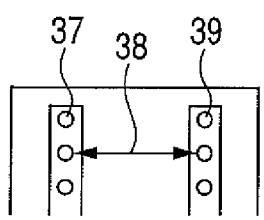
FIG. 15 is a view for illustrating the ejection orifice-to-ejection orifice distance X.

The term "ejection orifice-to-ejection orifice distance" refers to the distance between the ejection orifice for the pigment ink and the ejection orifice for the reactive ink. For example, when two types of inks that react with each other are defined as Ink A and Ink B, the ejection orifice-to-ejection orifice distance is as described below. The ejection orifice-to-ejection orifice distance X in the present invention will be described with reference to FIG. 15. That is, an ejection orifice-to-ejection orifice distance 38 is a distance indicated by an arrow in FIG. 15, in other words, the "shortest distance between the edge portion of an ejection orifice for Ink A and the edge portion of an ejection orifice for Ink B" in an ejection orifice 37 for ejecting Ink A and an ejection orifice 39 for ejecting Ink B, and is represented in a "mm" unit. When there are a plurality of ejection orifices for ejecting Ink A or Ink B, the ejection orifice-to-ejection orifice distance is defined as an ejection orifice-to-ejection orifice distance between ejection orifices in which a "distance between the edge portion of an ejection orifice for Ink A and the edge portion of an ejection orifice for Ink B" becomes shortest. The ejection orifice-to-ejection orifice distance X (mm) takes a value more than 0 because the distance X is a value representing a distance (that is, X>0). In the present invention, the lower limit of the ejection orifice-to-ejection orifice distance X is more than 0.0 mm, or preferably 1.5 mm or more. In addition, the upper limit of the ejection orifice-to-ejection orifice distance X is preferably 26.0 mm or less, or more preferably 22.0 mm or less. The size of the cap or of an ink jet recording apparatus main body must be increased as the ejection orifice-to-ejection orifice distance increases. Accordingly, the upper limit of the ejection orifice-to-ejection orifice distance X is preferably 26.0 mm or less for capping the pigment ink and the reactive ink in the identical cap. In addition, when the ejection orifice-to-ejection orifice distance is excessively large, a time interval between the application of the pigment ink to a recording medium and the application of the reactive ink to the recording medium increases, and sufficient reaction does not occur when these inks are brought into contact with each other, with the result that the effect of the present invention cannot be sufficiently obtained in some cases.

(Influence of Relationship Between Mixed Thickening Ratio Y and Ejection Orifice-to-Ejection Orifice Distance X on Reliability)

The present invention is characterized in that the mixed thickening ratio Y and the ejection orifice-to-ejection orifice distance X satisfy the relationship represented by the following expression (A) (provided that X>0):

$$Y \leq 0.60X + 50.0 \quad (A).$$

The expression (A) shows that where the ejection orifice-to-ejection orifice distance X is large, excellent reliability can be obtained even when a combination of the pigment ink and the reactive ink is such that the mixed thickening ratio Y is large, i.e., reactivity between the inks is high. An influence of a relationship between the mixed thickening ratio Y and the ejection orifice-to-ejection orifice distance X on reliability will be described below with reference to FIGS. 1A, 1B, 1C, 2A, 2B, and 2C.

The case where the mixed thickening ratio Y and the ejection orifice-to-ejection orifice distance X satisfy the relationship represented by the expression (A):

FIGS. 1A, 1B, and 1C are schematic views each showing a recording head part and a sucking part as a unit for removing an ink from the inside of a cap when an ejection orifice-to-ejection orifice distance is large, and the mixed thickening ratio Y and the ejection orifice-to-ejection orifice distance X satisfy the relationship represented by the expression (A). FIG. 1A shows the flow of an ink when the ink is sucked through the cap. In a recording head 1000, a reactive ink and a pigment ink are sucked respectively from an ejection orifice 1001 and an ejection orifice 1002 through a cap 1003 and an in-cap absorber 1005 and further through a tube 1004 as indicated by an arrow in FIG. 1A. FIG. 1B shows a state in which a reactive component 1006 in the reactive ink and a pigment 1007 in the pigment ink are sucked immediately after the initiation of the suction of the inks through the cap. The reactive ink and the pigment ink contact and mix with each other in the vicinity of the tube 1004 in the in-cap absorber 1005. FIG. 1C shows a state in which additional suction is performed after the state shown in FIG. 1B. The reactive ink and the pigment ink contact and mix with each other, whereby the reactive component 1006 in the reactive ink and the pigment 1007 in the pigment ink react with each other to form a reaction product wall 1008. Then, after the formation of the reaction product wall 1008, the pigment in the pigment ink and the reactive component in the reactive ink do not contact with each other owing to the presence of the wall, thus the state shown in FIG. 1C is maintained. In the present invention, excellent reliability may be obtained via the above-mentioned mechanism.

Even in the case where the ejection orifice-to-ejection orifice distance is large, reliability may be lowered when the reactivity is excessively high, that is, the mixed thickening ratio is excessively high. This is probably because the following phenomenon occurs when mist of the reactive ink and the pigment ink is generated by sucking operation. That is, the pigment and the reactive component produce reaction products in a space formed by the recording head and the cap, and the reaction products are captured by the reaction product wall before the performance of suction, and hence the reaction product wall grows to form a reaction product block. Then, the reaction product block grows and adheres to the recording head, with the result that reliability is lowered in some cases. However, excellent reliability can be obtained when the mixed thickening ratio Y and the ejection orifice-to-ejection orifice distance X satisfy the relationship defined in the present invention.

In addition, when an image is formed in, for example, the initial portion where recording is performed, only preliminary ejection is performed in the cap without performing any sucking operation in some cases. However, when ejection is preliminarily performed, the amount of an ink to be ejected into the cap is small. Therefore, when the ejection orifice-to-ejection orifice distance is large, and the mixed thickening ratio Y and the ejection orifice-to-ejection orifice distance X satisfy the relationship represented by the expression (A), the extent to which the pigment ink and the reactive ink mix with each other in the cap is small as long as the amounts of the inks are each comparable to the preliminary ejection, and hence reliability is nearly unaffected.

The case where the mixed thickening ratio Y and the ejection orifice-to-ejection orifice distance X do not satisfy the relationship represented by the expression (A):

FIGS. 2A, 2B, and 2C are schematic views showing a recording head part and a sucking part as a unit for removing an ink from the inside of a cap when an ejection orifice-to-ejection orifice distance is small, and the mixed thickening ratio Y and the ejection orifice-to-ejection orifice distance X do not satisfy the relationship represented by the expression (A). FIG. 2A shows the flow of an ink when the ink is sucked through the cap. In the recording head 1000, the reactive ink and the pigment ink are sucked respectively from the ejection orifice 1001 and the ejection orifice 1002 through the cap 1003 and the in-cap absorber 1005 and further through the tube 1004 as indicated by an arrow in FIG. 2A. FIG. 2B shows a state in which the reactive component 1006 in the reactive ink and the pigment 1007 in the pigment ink are sucked immediately after the initiation of the suction of the inks through the cap. The reactive ink and the pigment ink contact and mix with each other in the vicinity of the tube 1004 in the in-cap absorber 1005. As can be seen from comparison with FIG. 1B, when the ejection orifice-to-ejection orifice distance is small, the frequency at which the reactive ink and the pigment ink contact or mix with each other in the cap 1003 increases. FIG. 2C shows a state in which additional suction is performed after the state shown in FIG. 2B. The reactive ink and the pigment ink contact and mix with each other, whereby the reactive component 1006 in the reactive ink and the pigment 1007 in the pigment ink react with each other to form a reaction product block 1009. The reactant block 1009 grows and enlarges as a result of additional suction. Then, reliability may not be obtained as a result of the adhesion of the reactant block 1009 to the recording head 1000 as shown in FIG. 2C.

In addition, in this case, when only preliminary ejection is performed in the cap without performing any sucking operation when an image is formed in, for example, the initial portion where recording is performed, reliability may be lowered. When ejection is preliminarily performed, the amount of an ink to be ejected into the cap is small. However, a phenomenon in which the reactive ink and the pigment ink ejected into the cap mix with each other is more liable to occur in the case where the mixed thickening ratio Y and the ejection orifice-to-ejection orifice distance X do not satisfy the relationship represented by the expression (A) than in the above-mentioned case where the mixed thickening ratio Y and the ejection orifice-to-ejection orifice distance X satisfy the relationship represented by the expression (A). As a result, reaction products are generated to adhere to the recording head, thereby reducing reliability.

(Influence of Relationship Between Mixed Thickening Ratio Y and Ejection Orifice-to-Ejection Orifice Distance X on Image Quality)

The relationship between the mixed thickening ratio Y and the ejection orifice-to-ejection orifice distance X affects image quality as well. In order to obtain excellent image quality, it is required that the separation of an aqueous medium in the pigment ink from a solid content containing the pigment (solid-liquid separation) quickly occurs and that the agglomerate formed by the reaction between the reactive ink and the pigment ink is left on the surface of a recording medium.

The effect of the present invention of obtaining excellent image quality can be additionally significantly exhibited when an image is formed by applying the reactive ink to a recording medium prior to the pigment ink. However, the effect of the present invention of obtaining excellent image quality can be exhibited even when an image is formed by applying the pigment ink to a recording medium prior to the reactive ink.

Hereinafter, description is given by taking as an example the case where an image is formed by applying the reactive ink to a recording medium prior to the pigment ink, which can additionally significantly exhibit the effect. In this case, the reactive ink is applied, whereby the ink permeability of the recording medium is improved, and then the pigment ink is applied to the recording medium. However, the reactive ink that has been precedently applied to the recording medium continuously permeates in the depth direction of the recording medium until the pigment ink is applied to the recording medium. As a result, the extent to which the reactive ink permeates in the depth direction of the recording medium improves as a time period commencing on the application of the reactive ink to the recording medium and ending on the application of the pigment ink to the recording medium is longer. Therefore, as an interval between the application of the reactive ink to the recording medium and the application of the pigment ink to the recording medium is longer, the depth of the position at which the reaction between the reactive ink and the pigment ink occurs from the surface of the recording medium increases, with the result that the effect of improving image quality by the reaction between the inks is reduced. Then, the interval between the application of the reactive ink to the recording medium and the application of the pigment ink to the recording medium depends on the ejection orifice-to-ejection orifice distance. Accordingly, as the ejection orifice-to-ejection orifice distance becomes larger, the reactivity between the reactive ink and the pigment ink should be made higher, i.e., the mixed thickening ratio should be made larger. As described above, the interval between the application of the reactive ink to the recording medium and the application of the pigment ink to the recording medium is closely related to image quality, and the interval between the application of the reactive ink to the recording medium and the application of the pigment ink to the recording medium is related to the ejection orifice-to-ejection orifice distance, and furthermore, to the mixed thickening ratio.

As described above, the ejection orifice-to-ejection orifice distance and the mixed thickening ratio affect image quality in addition to reliability. It has been conventionally possible to obtain excellent image quality by using a plurality of inks that react with each other. However, it has been thought difficult to achieve compatibility between reliability with which ejection orifices for the plural inks that react with each other can be capped with the identical cap and image quality. In particular, when the cap doubles as an ink sucking mechanism as a unit for removing an ink, it has been thought impossible to cap ejection orifices for ejecting the plural inks that react with each other with the identical cap. That is, in ordinary cases, it is impossible to achieve compatibility between reliability and image quality in an ejection orifice-to-ejection orifice distance range in which the identical cap is considered to be preferably used. The foregoing will be described below with reference to a figure. FIG. 3 is a conceptual diagram showing a region in which image quality can be obtained and a region in which reliability can be obtained (when the identical cap is used) in such a conventional way of thinking as described above. In FIG. 3, the axis of ordinate indicates the mixed thickening ratio Y (%), and the axis of abscissa indicates the ejection orifice-to-ejection orifice distance X (mm). The ejection orifice-to-ejection orifice distance X indicated by the axis of abscissa represents the above-mentioned general ejection orifice-to-ejection orifice distance range in which the identical cap is considered to be preferably used. In FIG. 3, excellent image quality is obtained when the mixed thickening ratio Y is placed above an image quality borderline 1, and excellent reliability is obtained when the mixed thickening ratio Y is placed below a reliability borderline 2. As can be seen from FIG. 3, a conventional system in which an ejection orifice for a pigment ink and an ejection orifice for a reactive ink are capped with the identical cap has no region in which compatibility between image quality and reliability can be achieved in the ejection orifice-to-ejection orifice distance range in which the identical cap is considered to be preferably used.

Figure 4:
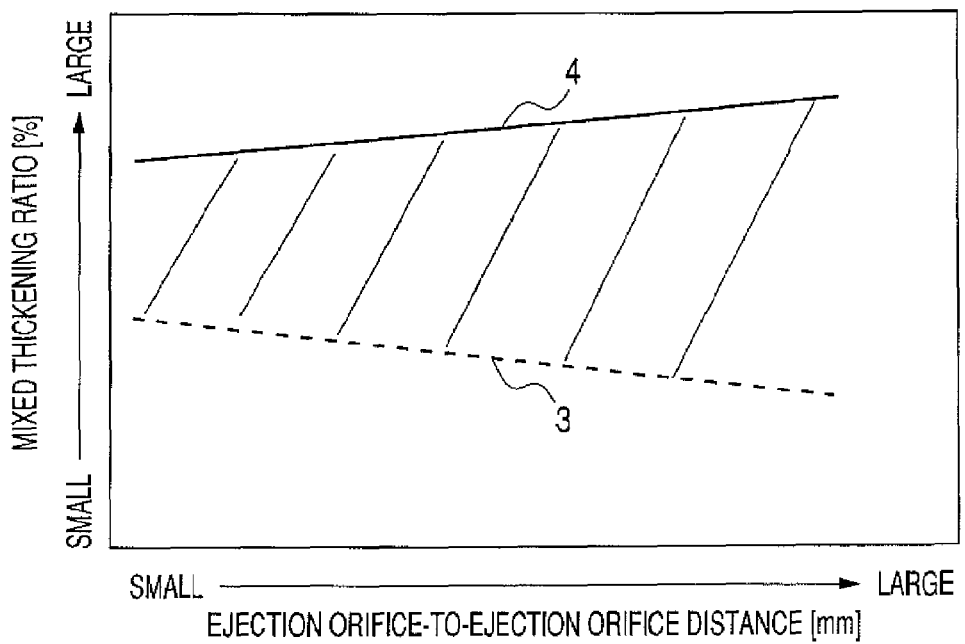
FIG. 4 is a graph showing a region where image quality can be obtained and a region where reliability can be obtained (when plural caps are used).

In view of the foregoing, in order that compatibility between image quality and reliability may be achieved, plural inks that react with each other has been prevented from mixing, that is, respective ejection orifices for ejecting the plural inks that react with each other have been capped with plural different caps. This will be described below with reference to a figure. FIG. 4 is a graph showing a region in which image quality can be obtained and a region in which reliability can be obtained (when plural caps are used). In FIG. 4, the axis of ordinate indicates the mixed thickening ratio Y (%), and the axis of abscissa indicates the ejection orifice-to-ejection orifice distance X (mm). The ejection orifice-to-ejection orifice distance X indicated by the axis of abscissa shifts to a range beyond the ejection orifice-to-ejection orifice distance range in which the identical cap is considered to be preferably used because plural caps are used. In FIG. 4, excellent image quality is obtained when the mixed thickening ratio Y is placed above an image quality borderline 3, and excellent reliability is obtained when the mixed thickening ratio Y is placed below a reliability borderline 4. As is apparent from FIG. 4, even in the ejection orifice-to-ejection orifice distance range in which the identical cap is considered to be preferably used, a region in which reliability can be obtained can be expanded by using plural caps, whereby a region in which compatibility between image quality and reliability can be achieved is present. A hatched region in the graph of FIG. 4 represents the region in which compatibility between image quality and reliability can be achieved.

However, the use of such plural caps as described above has resulted in an increase in size of an ink jet recording apparatus, the complication of the mechanism of the apparatus and an increase in cost. Accordingly, the capping of an ejection orifice for a reactive ink and an ejection orifice for a pigment ink with the identical cap has been strongly requested from the viewpoints of a reduction in size of the ink jet recording apparatus, the simplification of the mechanism of the apparatus and a reduction in cost.

Figure 5:
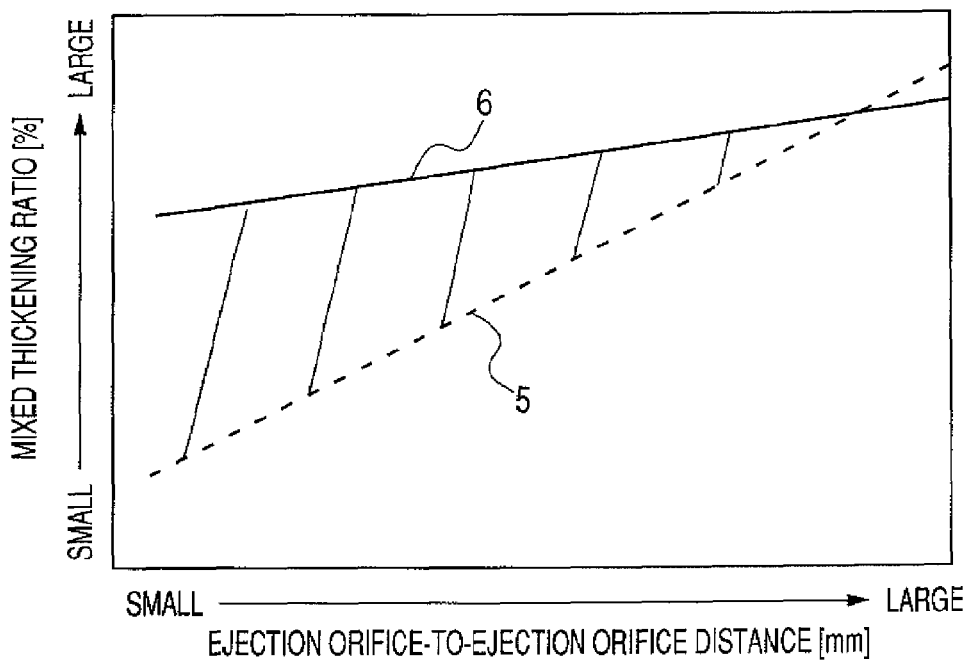
FIG. 5 is a graph showing a region where image quality can be obtained and a region where reliability can be obtained (when the identical cap is used).

In view of the foregoing, the inventors of the present invention have conducted investigation. As a result, the inventors have found that conditions under which compatibility between reliability and image quality can be achieved is present even when an ejection orifice for a reactive ink and an ejection orifice for a pigment ink are capped with the identical cap. This will be described below with reference to a figure. FIG. 5 is a graph showing a region in which image quality can be obtained and a region in which reliability can be obtained (when the identical cap is used). In FIG. 5, the axis of ordinate indicates the mixed thickening ratio Y (%), and the axis of abscissa indicates the ejection orifice-to-ejection orifice distance X (mm). The ejection orifice-to-ejection orifice distance X indicated by the axis of abscissa represents a general ejection orifice-to-ejection orifice distance range in which the identical cap is considered to be preferably used as in the case of FIG. 3. In FIG. 5, excellent image quality is obtained when the mixed thickening ratio Y is placed above an image quality borderline 5, and excellent reliability is obtained when the mixed thickening ratio Y is placed below a reliability borderline 6. A hatched region in the graph of FIG. 5 represents a region in which compatibility between image quality and reliability can be achieved.

(Three Borderlines in the Present Invention)

Figure 6:
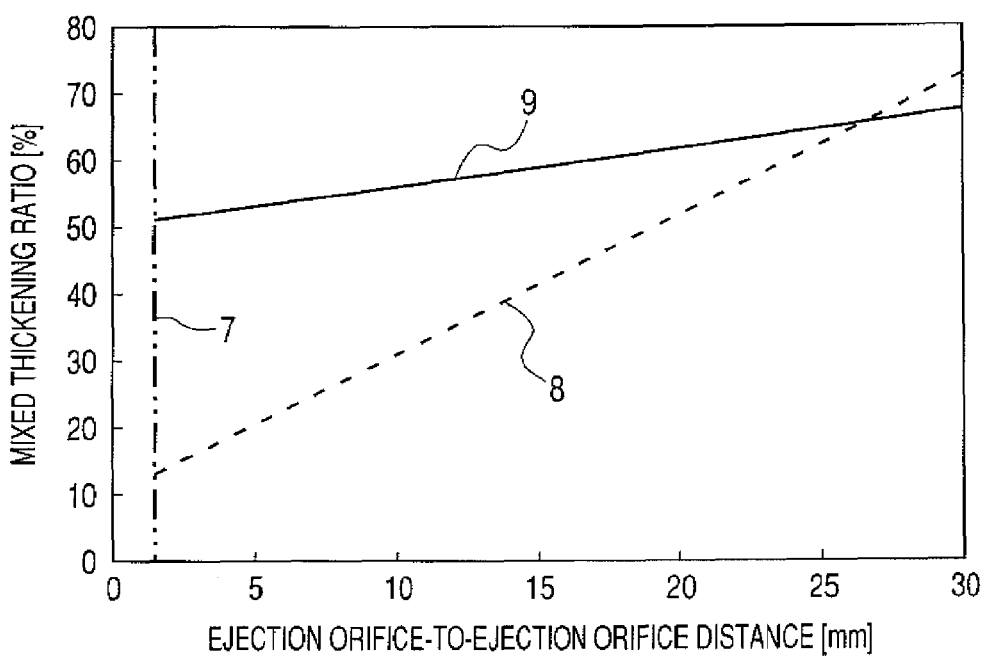
FIG. 6 is a graph showing a region where image quality can be obtained and a region where reliability can be obtained in the present invention.

In the present invention, borderlines were set by using a mixed thickening ratio and an ejection orifice-to-ejection orifice distance from the following three viewpoints: (1) the realizable, minimum ejection orifice-to-ejection orifice distance, (2) image quality, and (3) reliability. This will be described in detail with reference to a figure. FIG. 6 is a graph showing a region in which image quality can be obtained and a region in which reliability can be obtained in the present invention.

(1) Realizable, Minimum Ejection Orifice-to-Ejection Orifice Distance (Straight Line 7 in FIG. 6)

A straight line 7 in FIG. 6 represents the minimum ejection orifice-to-ejection orifice distance that can be realized in the current level of technology. When plural ejection orifice lines different from each other in ink flow path are formed in one plate, the minimum value of an ejection orifice-to-ejection orifice distance is limited from the viewpoints of the step of forming an ejection orifice line and the reliability of a recording head. In addition, plural plates in which ejection orifice lines are formed can be used in a row by being attached to each other with, for example, an adhesive. However, the minimum value of an ejection orifice-to-ejection orifice distance is still limited because a certain distance is required between an ejection orifice and the end of a plate, and an "overlap width" portion is necessary for attaching plural plates. In view of the foregoing, the minimum ejection orifice-to-ejection orifice distance realizable in the current level of technology has been defined in the present invention. If the minimum ejection orifice-to-ejection orifice distance can be reduced by an improvement in the current level of technology, the minimum value of an ejection orifice-to-ejection orifice distance may be smaller than a range represented by the following expression (1) as long as the effect of the present invention is not impaired, provided that the ejection orifice-to-ejection orifice distance X (mm) takes a value more than 0 because the distance X is a value representing a distance.

(2) Image Quality (Straight Line 8 in FIG. 6)

A straight line 8 in FIG. 6 shows the relationship between an ejection orifice-to-ejection orifice distance and a mixed thickening ratio for obtaining image quality. When the mixed thickening ratio is placed above the borderline, the reactivity between the plural inks that react with each other is sufficient, and excellent image quality is obtained. In addition, when the mixed thickening ratio is placed below the borderline, the reactivity between the plural inks that react with each other is insufficient, and the effect of using a reactive ink cannot be obtained.

In general, as an ejection orifice-to-ejection orifice distance between ejection orifices for plural inks that react with each other becomes larger, reactivity between the inks, i.e., a mixed thickening ratio between the inks should be made larger. The reason therefor is as described below. An ink that has been precedently applied to a recording medium permeates in the depth direction of the recording medium with the passage of time. Then, when the ejection orifice-to-ejection orifice distance is large, in other words, the time difference between the application of one ink of the plural inks that react with each other to the recording medium and the application of the next ink of the inks to the recording medium is large, the mixing of the plural inks that react with each other is slowed down. As a result, the inks are allowed to react at a deep portion in the depth direction of the recording medium, hence excellent image quality cannot be obtained in some cases. Accordingly, it is necessary to enhance reactivity between the inks so that the reaction can be brought about as soon as possible after applying the plural inks that react with each other to the recording medium.

It has been conventionally thought that when a plurality of inks that react with each other are used, if an ejection orifice-to-ejection orifice distance between ejection orifices for the inks is large even though reactivity between the inks is low, image quality on some level can be obtained. However, this effect can be obtained only when a pigment ink is applied to a recording medium prior to a reactive ink. When the pigment ink is precedently applied to the recording medium, the pigment ink undergoes evaporation or solid-liquid separation until the reactive ink is applied to the recording medium, so that the dispersed state of a pigment in the pigment ink becomes unstable. As a result, image quality on some level would be obtained even in a state in which only the pigment ink is applied to the recording medium. After that, the reactive ink is additionally applied to the recording medium to contact and react with the pigment ink, whereby image quality comes to be obtained. Therefore, when the pigment ink is applied to the recording medium prior to the reactive ink, image quality on some level can be obtained even though an ejection orifice-to-ejection orifice distance between ejection orifices for the inks is large.

However, when the reactive ink is applied to the recording medium prior to the pigment ink, a phenomenon different from the above-mentioned phenomenon occurs. When the reactive ink is precedently applied to the recording medium, the application of the reactive ink improves the ink permeability of the recording medium, and then the pigment ink is applied to the recording medium. As a result, the pigment ink is apt to permeate in the depth direction of the recording medium, hence reactivity between the inks should be improved in order that excellent image quality can be obtained.

Further, when the pigment ink is applied so as to be adjacent to a region on the recording medium where the reactive ink is applied, the application of the reactive ink to the recording medium improves the ink permeability of the recording medium. As a result, the pigment ink permeates into the region on the recording medium whose ink permeability is improved by applying the reactive ink, in such a manner that the pigment ink is drawn in the region. As a result, a phenomenon occurs in which the boundary between an image formed from the pigment ink and an image formed from the reactive ink is blurred whitely. In view of such a fact as well, when the reactive ink is applied to the recording medium prior to the pigment ink, reactivity between the inks must be made higher as an ejection orifice-to-ejection orifice distance between ejection orifices for the inks is made larger.

In the present invention, the borderline for obtaining image quality has been obtained in consideration of the foregoing. In this case, as described above, since image quality tends to become more difficult to obtain in the case where the reactive ink is applied to the recording medium prior to the pigment ink, emphasis has been placed on the above.

(3) Reliability (Straight Line 9 in FIG. 6)

A straight line 9 in FIG. 6 shows the relationship between an ejection orifice-to-ejection orifice distance and a mixed thickening ratio for obtaining reliability. When the mixed thickening ratio is placed above the borderline, the reactivity between the plural inks that react with each other is so high that reliability cannot be obtained. In addition, when the mixed thickening ratio is placed below the borderline, the reactivity between the plural inks that react with each other is proper, so that excellent reliability can be obtained.

An ejection orifice for a pigment ink and an ejection orifice for a reactive ink have been conventionally capped with different caps, and hence, sticking due to mist has largely affected reliability. As the ejection orifice-to-ejection orifice distance between the ejection orifices becomes larger, sticking due to mist during recording is less liable to occur, hence the mixed thickening ratio between the inks can be increased. Therefore, the conventional relationship between an ejection orifice-to-ejection orifice distance and a mixed thickening ratio for obtaining image reliability has been represented by the borderline shown by the straight line 4 in FIG. 4.

However, on the condition that the ejection orifice for the pigment ink and the ejection orifice for the reactive ink are capped with the identical cap, the following two phenomena that largely affect reliability must be taken into consideration: sticking due to mist and deposition of agglomerate generated by mixing inks in an in-cap absorber when sucking the inks the ejection orifices for which are capped with the identical cap. Therefore, the relationship between an ejection orifice-to-ejection orifice distance and a mixed thickening ratio for obtaining reliability is different between the case where the ejection orifices are capped with different caps and the case where the ejection orifices are capped with the identical cap, even when these cases are identical to each other in the ejection orifice-to-ejection orifice distance between the ejection orifices. As described above, as the ejection orifice-to-ejection orifice distance between the ejection orifices for the plural inks that react with each other becomes larger, the mixing of the inks in the in-cap absorber is less liable to occur when sucking the inks the ejection orifices for which are capped with the identical cap.

In the present invention, the borderline for obtaining reliability has been obtained in consideration of the foregoing. That is, the borderline has been obtained on which reliability can be obtained even when an ejection orifice-to-ejection orifice distance between ejection orifices for plural inks that react with each other is large and a mixed thickening ratio between the inks is large. The reliability borderline corresponds to the relationship between an ejection orifice-to-ejection orifice distance and a mixed thickening ratio when wiping the ejection orifices for the plural inks that react with each other with the identical wiper in the case where no special mechanism is used in a wiping mechanism part using a wiper.

In the present invention, both image quality and reliability can be made excellent by simultaneously satisfying all the above-mentioned three conditions (1) to (3). As a result of the investigation conducted by the inventors of the present invention, it has been found that the above-mentioned three conditions are represented by the following expressions (1), (2), and (3):

$$X \geq 1.5 \tag{1}$$

$$Y \geq 2.1X + 10.0 \tag{2}$$

$$Y \leq 0.60X + 50.0 \tag{3}$$

In the present invention, a specific relationship is established between reactivity between a pigment ink and an ink that reacts with the pigment ink, i.e., a mixed thickening ratio between the inks, and an ejection orifice-to-ejection orifice distance between ejection orifices for the inks. As a result, the ejection orifices for these inks can be capped with the identical cap provided with a unit for removing an ink such as a suction recovery mechanism. In other words, a combination of a conventional pigment ink and an ink that reacts with the pigment ink does not satisfy the specification of the present invention because reactivity between the inks is high, i.e., a mixed thickening ratio between the inks is large, with respect to the ejection orifice-to-ejection orifice distance between ejection orifices for the inks.

(Reaction Between Pigment Ink and Reactive Ink)

In the present invention, the composition of each of the pigment ink and the reactive ink is preferably selected so that the dispersed state of the pigment in the pigment ink is destabilized when the pigment ink and the reactive ink are mixed. Specifically, the following may be cited: (1) an embodiment in which the reactive ink contains a dye that destabilizes the dispersed state of the pigment in the pigment ink and (2) an embodiment in which the reactive ink contains, for example, a reactive component that destabilizes the dispersed state of the pigment in the pigment ink. The above-mentioned embodiment (1) may specifically include the following embodiments (A), (B) and (C). In addition, the above-mentioned embodiment (2) may specifically include the following embodiments (D) and (E).

(A) An embodiment in which the pigment in the pigment ink has an anionic group, and the dye in the reactive ink has a cationic group. In this case, the mixing of the pigment ink and the reactive ink results in a reaction between the cationic group of the dye and the anionic group of the pigment to cause the disruption of dispersion and agglomeration of the pigment, and thickening of the pigment ink.

(B) An embodiment in which the pigment in the pigment ink has a cationic group, and the dye in the reactive ink has an anionic group. In this case, the mixing of the pigment ink and the reactive ink results in a reaction between the anionic group of the dye and the cationic group of the pigment to cause the disruption of dispersion and agglomeration of the pigment, and thickening of the pigment ink.

(C) An embodiment in which the pigment in the pigment ink has an anionic group, and the dye in the reactive ink has an anionic group having a large number of solubilizing groups. In this case, the mixing of the pigment ink and the reactive ink results in a reaction between a counter ion (cation) of the dye and the anionic group of the pigment to cause the disruption of dispersion and agglomeration of the pigment, and thickening of the pigment ink.

(D) An embodiment in which the pigment in the pigment ink has an anionic group, and the reactive ink contains, for example, a polyvalent metal as a reactive component. In this case, the mixing of the pigment ink and the reactive ink results in a reaction between a cation (polyvalent metal ion) of a polyvalent metal salt and the anionic group of the pigment to cause the disruption of dispersion and agglomeration of the pigment, and thickening of the pigment ink. While the polyvalent metal salt is present in the ink in a state of being dissociated into a polyvalent metal ion and an anion, the phrase "the ink contains the polyvalent metal salt" is applicable even to this case. A specific means for incorporating the polyvalent metal into the ink is to incorporate the polyvalent metal salt into the ink. Specific examples of the polyvalent metal ion include $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$, and $Al^{3+}$. In addition, specific preferable examples of the anion include $NO_3^-$, $SO_4^{2-}$, and $Cl^-$. In the present invention, $Mg^{2+}$ among the above-mentioned polyvalent metal ions is particularly preferably used from the viewpoints of, for example, the storage stability of the reactive ink and the prevention of dissolution of a member in contact with the reactive ink (such as an ink flow path in an ink jet recording apparatus). In addition, $NO_3^-$, $SO_4^{2-}$, or $Cl^-$ among the above-mentioned anions is preferably used from the viewpoint of solubility, and $NO_3^-$ is particularly preferably used because of its excellent solubility in water. The content (mass %) of the polyvalent metal in the reactive ink is preferably 0.01 mass % or more and 10.0 mass % or less with respect to the total mass of the reactive ink, and in the form of a polyvalent metal salt, is preferably 0.1 mass % or more and 15.0 mass % or less.

(E) An embodiment in which the pH of each ink is adjusted so that the pigment in the pigment ink is stably dispersed in a region $pH_A$, the pH of the reactive ink is $pH_B$, and the pH of the mixed ink of the pigment ink with the reactive ink falls within a region $pH_C$. In this case, the mixing of the pigment ink and the reactive ink changes the pH of the pigment ink to cause the disruption of dispersion and agglomeration of the pigment, and thickening of the pigment ink. The symbol "$pH_A$" refers to a pH region in which the pigment is stably dispersed, and the symbol "$pH_C$" refers to a pH region in which the pigment is unstably dispersed.

(Kinds of Reactive Inks)

The pigment ink according to the present invention can sufficiently provide excellent image quality and reliability by being used together with one type of reactive ink. However, in the present invention, the reactivity between the pigment ink and the reactive ink, i.e., the mixed thickening ratio between the inks, is controlled to fall within a certain range, thereby enabling the ejection orifice for the pigment ink and an ejection orifice for the reactive ink to be capped with the identical cap. Accordingly, the use of only one type of reactive ink exerts a limited improving effect on image quality. Therefore, in order to obtain additionally excellent image quality, it is particularly preferable that at least two types of reactive inks which destabilizes the dispersed state of the pigment in the pigment ink are used. For example, in the case where two types of reactive inks are used, when the pigment ink is mixed with each of the reactive inks, a reactive ink having a relatively large mixed thickening ratio is defined as a strongly reactive ink, and a reactive ink having a relatively small mixed thickening ratio is defined as a weakly reactive ink.

When two or more types of reactive inks are used, an ejection orifice for a weakly reactive ink having the lowest reactivity, i.e., the lowest mixed thickening ratio, and the ejection orifice for the pigment ink are preferably capped with the identical cap in order that reliability can be obtained.

A mixed thickening ratio between the pigment ink and the weakly reactive ink the ejection orifices for which are capped with the identical cap is represented by Y (%), and an ejection orifice-to-ejection orifice distance between the ejection orifices for the pigment ink and the weakly reactive ink is represented by X (mm) (provided that X>0). In this case, the mixed thickening ratio Y (%) and the ejection orifice-to-ejection orifice distance X (mm) should satisfy a relationship represented by the following expression (A):

$$Y \leq 0.60X + 50.0 \tag{A}$$

In this case as well, the ejection orifice-to-ejection orifice distance X (mm) between the ejection orifices for the pigment ink and the weakly reactive ink, and the mixed thickening ratio Y (%) between the pigment ink and the weakly reactive ink preferably satisfy relationships represented by the following expressions (1) and (2):

$$X \geq 1.5 \tag{1}$$

$$Y \geq 2.1X + 10.0 \tag{2}$$

In addition, an ejection orifice for a strongly reactive ink can be capped with the identical cap which caps the ejection orifice for the pigment ink, or can be capped with a cap different from one that caps the ejection orifice for the pigment ink. When the ejection orifice for the pigment ink and the ejection orifice for the strongly reactive ink are capped with the identical cap, the following two conditions should be satisfied. That is, the relationship between the mixed thickening ratio Y (%) between the pigment ink and the weakly reactive ink, and the ejection orifice-to-ejection orifice distance X (mm) between the ejection orifices for the pigment ink and the weakly reactive ink should satisfy the relationship represented by the following expression (A). Further, the relationship between a mixed thickening ratio Y (%) between the pigment ink and the strongly reactive ink, and an ejection orifice-to-ejection orifice distance X (mm) between the ejection orifices for the pigment ink and the strongly reactive ink (provided that X>0) should also satisfy the relationship represented by the following expression (A).

$$Y \leq 0.60X + 50.0 \tag{A}$$

In this case as well, the ejection orifice-to-ejection orifice distance X (mm) between the ejection orifices for the pigment ink and the strongly reactive ink, and the mixed thickening ratio Y (%) between the pigment ink and the strongly reactive ink preferably satisfy relationships represented by the following expressions (1) and (2):

$$X \geq 1.5 \quad (1)$$

$$Y \geq 2.1X + 10.0 \quad (2).$$

When two or more kinds of reactive inks are used, an ejection orifice-to-ejection orifice distance between the ejection orifices for a strongly reactive ink having relatively high reactivity (i.e., a relatively large mixed thickening ratio) and the pigment ink should be larger than an ejection orifice-to-ejection orifice distance between the ejection orifices for a weakly reactive ink and the pigment ink. This is because, as described above for an image quality borderline, when plural inks that react with each other are used, reactivity between the inks (i.e., a mixed thickening ratio between the inks) and an ejection orifice-to-ejection orifice distance between ejection orifices for the inks are related to image quality. In order that image quality in the case of using a strongly reactive ink and image quality in the case of using a weakly reactive ink are identical to each other, an ejection orifice-to-ejection orifice distance between the ejection orifices for the strongly reactive ink and the pigment ink should be larger than an ejection orifice-to-ejection orifice distance between the ejection orifices for the weakly reactive ink and the pigment ink. As described above, even when inks different from each other in reactivity are used as reactive inks to be used in combination with the pigment ink, similar images can be formed by setting an ejection orifice-to-ejection orifice distance between ejection orifices for the pigment ink and each reactive ink according to reactivity between the pigment ink and each reactive ink. In addition, even reliability can be improved by the setting.

In addition, the ejection orifice for the pigment ink is preferably interposed between respective ejection orifices for two types of reactive inks. This is because bi-directional unevenness can be reduced by always keeping the order in which the pigment ink and the reactive inks are applied to a recording medium upon performance of bi-directional recording unchanged.

(Hues of Pigment Ink and Reactive Ink)

The reactive ink preferably has the same hue as the pigment ink. In addition, when two or more types of reactive inks are used, at least one type of reactive ink preferably has the same hue as the pigment ink. Further, it is particularly preferable that a reactive ink an ejection orifice for which is capped with the identical cap that caps the ejection orifice for the pigment ink has the same hue as the pigment ink. This is due to the following reason: in the case where capping is effected with the identical cap, if the pigment ink and the reactive ink have the same hue, a problem concerning the color developability of an image in the initial portion of recording hardly occurs even when the pigment ink and the reactive ink are mixed. In the present invention, excellent image quality and excellent bleeding resistance can be obtained by applying the pigment ink and the reactive ink to a recording medium so that the inks overlap each other; and allowing these inks to react with each other. Therefore, an image formed by using the ink of the present invention is an image in which the coloring materials of the pigment ink and the reactive ink are mixed. In this case, if the pigment ink and the reactive ink do not have the same hue, coloring materials different from each other in hue are applied to a recording medium so as to overlap each other, thereby undesirably forming an image having a hue different from the pigment ink.

When the reactive ink has a hue different from the pigment ink, the hue is preferably adjusted to the same hue as the pigment ink by using an ink having any other hue. For example, when the pigment ink has a black hue and the reactive ink has a cyan hue, the hue of the reactive ink is preferably adjusted by applying, for example, a magenta ink or a yellow ink to a region on a recording medium to which the reactive ink is applied so that the inks overlap each other.

In addition, for example, in the case where one of two types of reactive inks is a reactive ink having the same hue as the pigment ink and the other is a reactive ink having a hue different from the pigment ink, when the reactive ink having the different hue is used, the different hue is preferably adjusted by using an ink having any other hue. This is because the adjustment results in an image having the same hue as an image formed by using a reactive ink having the same hue as the pigment ink.

The phrase "the pigment ink and the reactive ink have the same hue" as used herein refers to the following: when the pigment ink is a black ink, a difference in chroma $\Delta C^*$ between the pigment ink and the reactive ink is 0 or more and 15 or less, and preferably 0 or more and 10 or less. When a difference in chroma is more than 15, the hue of the reactive ink becomes vivid, hence the hue of an image to be formed may vary owing to an influence of the hue of the reactive ink when the reactive ink and the pigment ink are mixed. In addition, the phrase refers to the following: when the pigment ink is a color ink, a difference in hue angle $\Delta h$ between the pigment ink and the reactive ink is 0 or more and 60 or less, and preferably 0 or more and 30 or less. When a difference in hue angle is more than 60, a difference in hue between the pigment ink and the reactive ink becomes large, so the hue of an image to be formed may vary owing to an influence of the hue of the reactive ink when the reactive ink and the pigment ink are mixed. In addition, brightness $L^*$ of the reactive ink is preferably close to that of the pigment ink. As an example of a combination of inks in which the pigment ink and the reactive ink have the same hue, a case is cited where both the pigment ink and the reactive ink are black inks. The phrase "the reactive ink has a hue different from that of the pigment ink" refers to a state where the difference in chroma or hue angle between the pigment ink and the reactive ink deviates from such a range as described above. Specifically, for example, when the pigment ink is a black ink and the reactive ink is a magenta ink, a yellow ink or a cyan ink, the difference in chroma or hue angle between the pigment ink and the reactive ink deviates from such a range as described above.

In the present invention, both the pigment ink and the reactive ink are particularly preferably black inks. In addition, when two or more types of reactive inks are used, at least one of the reactive inks and the pigment ink are preferably black inks. In this case, for example, a cyan ink or a magenta ink, especially a cyan ink, is particularly preferably used as a reactive ink in combination with the black inks. In this case, furthermore, a black ink as a reactive ink is particularly preferably a weakly reactive ink, and the cyan ink is particularly preferably a strongly reactive ink. In addition, it is particularly preferable that the pigment ink is a black ink and a reactive ink an ejection orifice for which is capped with the identical cap that caps the ejection orifice for the pigment ink is a black ink.

(Physical Properties of Pigment Ink and Reactive Ink)

In the present invention, the ejected volume of each of the pigment ink and the reactive ink is preferably made small. The reason therefor is as described below. When the ejected volume of the pigment ink is small, the surface area of ink droplets becomes large, so that evaporation of the aqueous medium in the ink is quickly brought about before the droplets adhere to a recording medium. The dispersed state of the pigment in the pigment ink becomes unstable in association with the evaporation, and destabilization of the dispersed state of the pigment ink itself further proceeds as the ejected volume becomes smaller. When the pigment ink in which the pigment is unstably dispersed contacts and reacts with the reactive ink, the destabilization of the dispersed state is additionally accelerated, whereby image quality is improved. The ejected volume of the pigment ink is preferably 5 pl or less in order to obtain such an effect. In addition, as the ejected volume of the reactive ink becomes smaller, an area per dot upon application of the reactive ink to a recording medium becomes smaller, so that the degree of freedom in dot arrangement upon application of a certain amount of ink to a certain region of the recording medium can be increased. As a result, the pigment ink and the reactive ink can be allowed to react effectively with each other, whereby image quality is improved. The ejected volume of the reactive ink is preferably 5 picoliter or less in order to obtain such an effect.

In addition, the viscosity of each of the pigment ink and the reactive ink is preferably 1 mPa·s or more and 5 mPa·s or less in order that ejection stability is achieved and the viscosity of a mixed ink is properly adjusted.

(Pigment Ink)

(Coloring Material)

A coloring material to be used for a pigment ink is preferably as follows: carbon black is used as a pigment to be used in a black ink, and an organic pigment is used as a pigment to be used in any ink other than the black ink. The manner in which a pigment is dispersed in the pigment ink may be of, for example, a self dispersion type or a polymer dispersion type in which a polymer is used as a dispersant. Those pigments may each be used alone or in a mixture of two or more types. Alternatively, for the purpose of, for example, color toning, a dye can be used in addition to a pigment.

The content (mass %) of the pigment in the pigment ink is preferably 0.1 mass % or more and 15.0 mass % or less, and more preferably 1.0 mass % or more to 10.0 mass % or less with respect to the total mass of the pigment ink.

(Self Dispersion Pigment)

In the present invention, a self dispersion pigment in which at least one hydrophilic group is bonded to the surface of a pigment particle directly or via another atomic group (—R—) is preferably used. The use of such a self dispersion pigment can eliminate a need for the addition of a dispersant for dispersing a pigment in ink, or can reduce the addition amount of a dispersant.

Specific examples of the hydrophilic group bonded to the surface of a pigment particle include —COO($M_1$), —$SO_3$($M_1$), —$PO_3H$($M_1$), —$PO_3(M_1)_2$, and —(COO($M_1$))$_n$ where "$M_1$" represents a hydrogen atom, an alkali metal, an ammonium, or an organic ammonium, and n represents an integer of 2 or more. In addition, examples of the atomic group (—R—) include an alkylene group having 1 to 12 carbon atoms, a substituted or unsubstituted phenylene group, and a substituted or unsubstituted naphthylene group. The invention is not limited to the above. The hydrophilic group in the ink may be in a state that it is partly or completely dissociated.

In the present invention, among others, a pigment the surface of which is bonded to a compound obtained by a diazo coupling method, having in part of itself a structure represented by the above —R—(COO$M_1$)$_n$ group can be suitably used. The present invention is not limited to the above.

Of those self dispersion pigments, a self dispersion pigment in which a —R—(COO$M_1$)$_n$ group is bonded to the surface of a pigment particle is particularly preferably used because excellent image quality and excellent bleeding resistance can be obtained. It is surmised that an interaction between the self dispersion pigment and a water-soluble organic solvent in the ink is largely involved therein. That is, when a —R—(COO$M_1$)$_n$ group is bonded to the surface of a pigment particle, in particular, when the —R—(COO$M_1$)$_n$ groups are bonded to the surface of a pigment particle at higher density, the following phenomenon is expected to occur.

When a —R—(COO$M_1$)$_n$ group bonded to the surface of a pigment particle is present in the ink, steric hindrance is allowed to easily occur. Accordingly, a pigment particle to which a —R—(COO$M_1$)$_n$ group is bonded and a water-soluble organic solvent present near the particle less undergo salvation as compared to the conventional self dispersion pigment and a water-soluble organic solvent present near the pigment. As a result, upon application of the ink to a recording medium, the separation of an aqueous medium in the ink from a solid content containing the pigment (solid-liquid separation) may be extremely quickly caused. In addition, when it is difficult for the water-soluble organic solvent in the ink to solvate the pigment, the effect of stabilizing the dispersed state of the pigment, exhibited by salvation in the ink becomes small, hence the agglomeration of the pigment in the recording medium is expected to additionally remarkably occur.

The term "salvation" as used herein refers to an affinity between the pigment and the water-soluble organic solvent, and depends on the extent to which the pigment has sites having an affinity for the water-soluble organic solvent. An example of the site having an affinity for the water-soluble organic solvent is a site on the surface of a pigment particle to which no hydrophilic group is bonded. For example, when groups having ionicity are bonded to the surface of a pigment particle at high density, an area on the surface of the pigment particle in which a site having an affinity for the water-soluble organic solvent is exposed is small. In addition, when the surface of a pigment particle is covered with hydrophilic groups at higher density, the following phenomenon occurs: it becomes difficult for the water-soluble organic solvent to solvate the pigment, owing to the synergistic effect of an influence of steric hindrance by the hydrophilic groups and an influence of a reduction in sites of the pigment each having an affinity for the water-soluble organic solvent.

In addition, in the —R— bonded to the surface of a pigment particle, a carbon atom adjacent to a carbon atom to which —(COO$M_1$) is bonded preferably has —(COO$M_1$) bonded to itself. In addition, n described above preferably represents 2, and R described above preferably represents $C_6H_3$. This is because the above-mentioned constitution can provide excellent effects on image quality and bleeding resistance. The phrase "in —R— bonded to the surface of a pigment particle, a carbon atom adjacent to a carbon atom to which —(COO$M_1$) is bonded has —(COO$M_1$) bonded to itself" means that two or more adjacent carbon atoms in R each have a —(COO$M_1$) group. This specifically means that such a structure as represented by the following formula (I) is present. In the present invention, a self dispersion pigment in which a group represented by the following formula (I) is bonded to the surface of a pigment particle is preferably used. The present invention is not limited thereto.

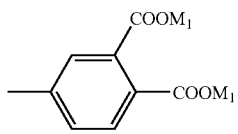

Formula (1)

In addition, in the pigment ink, the —R—$(COOM_1)_n$ groups are preferably bonded to the surface of a pigment particle at higher density. To be specific, for example, the hydrophilic group density on the surface of a pigment particle is preferably 2.00 $\mu mol/m^2$ or more. This is because the above-mentioned solid-liquid separation resulting from the degree of salvation is additionally promoted, and the above-mentioned effects can be additionally significantly obtained. In the present invention, the hydrophilic group density in a pigment particle is not limited to the foregoing range because the density is largely affected by, for example, the specific surface area of the pigment and the structure of a functional group bonded to the surface of the pigment particle.

Further, in an aqueous ink according to the present invention, $M_1$ described above particularly preferably represents an ammonium because additionally excellent water resistance can be obtained. This is probably because, upon application of the ink to a recording medium, the ammonium is decomposed and ammonia evaporates, and a hydrophilic group bonded to the surface of a pigment particle comes to be of an H type (acid type), thereby reducing hydrophilicity. A self dispersion pigment in which $M_1$ represents an ammonium can be obtained by, for example, a method in which a self dispersion pigment in which $M_1$ represents an alkali metal is subjected to an ion exchange method to replace $M_1$ by an ammonium or a method in which an acid is added to turn a hydrophilic group bonded to the surface of a pigment particle into an H type, and ammonium hydroxide is added to turn $M_1$ into an ammonium.

(Polymer Dispersion Pigment)

The pigment ink can use a dispersant (polymer) for dispersing a pigment in the ink. Any dispersant can be used as long as the dispersant has water solubility. In the present invention, a dispersant having a hydrophilic group and capable of stably dispersing a pigment in an aqueous medium by action of the group is particularly preferable. A dispersant having a weight average molecular weight of 1,000 to 30,000 is preferably used; a dispersant having a weight average molecular weight of 3,000 to 15,000 is more preferably used. The content (mass %) of the dispersant in the pigment ink is preferably 0.1 mass % or more to 10.0 mass % or less with respect to the total mass of the pigment ink. In addition, a ratio of the content of the pigment in the pigment ink to the content of the dispersant in the pigment ink (P/B ratio=pigment content/dispersant content) is preferably 0.02 or more to 150 or less.

Specific examples of a usable dispersant include a styrene-acrylic acid copolymer, a styrene-acrylic acid-alkyl acrylate copolymer, a styrene-maleic acid copolymer, a styrene-maleic acid-alkyl acrylate copolymer, a styrene-methacrylic acid copolymer, a styrene-methacrylic acid-alkyl acrylate copolymer, a styrene-maleic acid half ester copolymer, a vinylnaphthalene-acrylic acid copolymer, a vinylnaphthalene-maleic acid copolymer, a styrene-maleic anhydride-maleic acid half ester copolymer, and salts of these copolymers.

(Carbon Black)

Carbon black is an example of a pigment to be used in a black ink. Examples of carbon black to be used include furnace black, lamp black, acetylene black, and channel black. Specifically, any of the following commercially available products may be used. The present invention is not limited thereto.

Raven: 7000, 5750, 5250, 5000 ULTRA, 3500, 2000, 1500, 1250, 1200, 1190 ULTRA-II, 1170, and 1255 (all of which are manufactured by Columbia); Black Pearls L, Regal: 400R, 330R, 660R, Mogul L, Monarch: 700, 800, 880, 900, 1000, 1100, 1300, 1400, and Valcan XC-72R (all of which are manufactured by Cabot Corporation); Color Black: FW1, FW2, FW2V, FW18, FW200, S150, S160, S170, Printex: 35, U, V, 140U, 140V, Special Black: 6, 5, 4A, and 4 (all of which are manufactured by Degussa); and No. 25, No., 33, No. 40, No. 47, No. 52, No. 900, No. 2300, MCF-88, MA600, MA7, MA8, and MA100 (all of which are manufactured by Mitsubishi Chemical Corporation).

Carbon black newly prepared for the present invention may also be used. Magnetic fine particles made of magnetite or ferrite, and titanium black may be used as the black pigment instead of carbon black.

(Organic Pigments)

Examples of pigments to be used except the black ink include various organic pigments. Specific examples of the organic pigments include the following:

Insoluble azo pigments such as toluidine red, toluidine maroon, Hansa yellow, benzidine yellow, and pyrazolone red; soluble azo pigments such as lithol red, helio bordeaux, pigment scarlet, and permanent red 2B; derivatives of vat dyes such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; indigo-based pigments; condensed azo-based pigments; thioindigo-based pigments; diketopyrrolopyrrole-based pigments; flavanthrone yellow, acylamide yellow, quinophthalone yellow, nickel azo yellow, copper azo methine yellow, perinone orange, anthrone orange, dianthraquinonyl red, and dioxazine violet.

Further, examples of the organic pigment represented by a color index number that can be used in the present invention include the following: C.I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180, and 185. C.I. Pigment Orange: 16, 36, 43, 51, 55, 59, 61, and 71; C.I. Pigment Red: 9, 48, 49, 52, 53, 57, 97, 122, 123, 149, 168, 175, 176, 177, 180, and 192; or C.I. Pigment Red: 215, 216, 217, 220, 223, 224, 226, 227, 228, 238, 240, 254, 255, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26.

(Salt)

The pigment ink preferably contains a salt. Thus, a pigment ink can be obtained which prevents image quality from largely varying depending on the kind of a recording medium and can stably provide a high image density and excellent image quality. Further, when an image formed only from the pigment ink and an image formed from the mixture of a reactive ink and the pigment ink are intermingled in a black image region, the image densities of these images become substantially equal to each other, whereby an image having no visual sense of discomfort can be formed.

The salt in the pigment ink may be in a state in which it is partly or completely dissociated.

Specific examples of a salt that can be used in the pigment ink include $(M_2)NO_3$, $CH_3COO(M_2)$, $C_6H_5COO(M_2)$, $C_2H_4(COO(M_2))_2$, $C_6H_4(COO(M_2))_2$, and $(M_2)_2SO_4$ where "$M_2$" represents an alkali metal, an ammonium or an organic ammonium. The present invention is not limited thereto.

The content of the salt in the pigment ink should be in such a range that the effect of the present invention can be sufficiently exhibited. To be specific, the content (mass %) of the salt is preferably 0.05 mass % or more and 10.0 mass % or less with respect to the total mass of the ink. A content of less than 0.05 mass % may be unable to provide the effect of the present invention, while a content in excess of 10.0 mass % may be unable to provide the storage stability of the ink.

In addition, $M_2$ described above more preferably represents an ammonium because additionally excellent water resistance can be obtained. Of the ammoniums, $NH_4NO_3$, $C_2H_4(COONH_4)_2$, $C_6H_4(COONH_4)_2$ and $(NH_4)_2SO_4$ are particularly preferable because water resistance is expressed within a relatively short time period. In addition, the case where the salt is $C_2H_4(COO(M_2))_2$, $C_6H_4(COO(M_2))_2$, or $(M_2)_2SO_4$ is more preferable because the pigment is especially excellent in dispersion stability even when moisture in the ink is evaporated during storage. In addition, for example, when n represents 2 in a self dispersion pigment in which a —R—$(COOM_1)_n$ group is bonded to the surface of a pigment particle, a divalent salt is preferably used as a salt to be used in combination with the self dispersion pigment. This is a case where the valence number of a functional group on the surface of a pigment particle and the valence number of a salt are equal to each other, which is particularly preferable because the effect of the present invention can be additionally significantly obtained. A specific example of such a combination is a combination of a self dispersion pigment in which a —R—$(COOM_1)_2$ group is bonded to the surface of a pigment particle and a salt such as $C_2H_4(COO(M_2))_2$, $C_6H_4(COO(M_2))_2$, or $(M_2)_2SO_4$. The present invention is not limited to the above.

(Aqueous Medium)

Water, or an aqueous medium as a mixed solvent of water and a water-soluble organic solvent is preferably used in the pigment ink. Preferable water to be used is not general water containing various ions, but deionized water. The content (mass %) of water in the pigment ink is preferably 50.0 mass % or more and 95.0 mass % or less with respect to the total mass of the pigment ink. In addition, the water-soluble organic solvent is particularly preferably one having the effect of preventing the ink from drying. The content (mass %) of the water-soluble organic solvent in the pigment ink is preferably 3.0 mass % or more and 50.0 mass % or less with respect to the total mass of the pigment ink.

Specific examples of a water-soluble organic solvent that can be used include the following. The following water-soluble organic solvents can each be used alone or in a mixture of two or more types.

Specific examples of a water-soluble organic solvent include: alkyl alcohols each having 1 to 6 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols having 2 to 6 carbon atoms such as ethylene glycol, propylene glycol, butylene glycol, triethylene glycol, 1,2,6-hexane triol, thio diglycol, hexylene glycol, and diethylene glycol; alkyl ether acetates such as polyethylene glycol monomethyl ether acetate; glycerin; alkyl ethers of polyhydric alcohols such as ethylene glycol monomethyl (or ethyl)ether, diethylene glycol methyl (or ethyl) ether, and triethylene glycol monomethyl (or ethyl) ether; and N-methyl-2-pyrrolidone; 2-pyrrolidone; and 1,3-dimethyl-2-imidazolidinone.

(Other Components)

The pigment ink may contain a moisture-retaining compound such as urea, a urea derivative, trimethylolpropane, or trimethylolethane for maintaining moisture retentivity in addition to the above-mentioned components. In general, the content (mass %) of the moisture-retaining compound such as urea, a urea derivative, or trimethylolpropane is preferably 0.1 mass % or more and 20.0 mass % or less, and more preferably 3.0 mass % or more to 10.0 mass % or less with respect to the total mass of the pigment ink.

Further, the pigment ink may contain various compounds as required in addition to the above-mentioned components so as to have desired physical property values. Specific examples thereof include, for example, a surfactant, a pH adjustor, an antifoaming agent, a rust inhibitor, an antiseptic, a mildewproofing agent, an antioxidant, an antireducing agent, an evaporation accelerator, and a chelating agent. Further, to the pigment ink, a water-soluble dye may be added.

In addition, the addition of a polymer to the pigment ink as required can improve the abrasion resistance or marker resistance of an image. Among others, a nonionic polymer having no ionic group can be suitably used because the polymer has a small influence on the reliability of the ink.

(Reactive Ink)

A reactive ink to be used in the present invention must have a destabilizing action on the dispersed state of the pigment in the pigment ink. To be specific, either of the following constitutions is preferable: (1) a constitution in which the reactive ink contains a dye that destabilizes the dispersed state of the pigment in the pigment ink and (2) a constitution in which the reactive ink contains, for example, a reactive component that destabilizes the dispersed state of the pigment in the pigment ink. To be more specific, the reactive ink is preferably of any one of the above-mentioned constitutions (A) to (E).

(Coloring Material)

A coloring material to be used in the reactive ink is preferably a dye, specifically, for example, an acidic dye or a direct dye. Any existing dyes or any newly synthesized dyes can be used as long as thy have proper color tones and proper densities, and can be used alone or in a mixture of two or more types. The content (mass %) of the coloring material in the reactive ink of the present invention is preferably 0.1 mass % or more and 10.0 mass % or less with respect to the total mass of the reactive ink. A content of less than 0.1 mass % may be unable to provide sufficient image quality, while a content in excess of 10.0 mass % may be unable to provide sticking recoverability.

(Yellow Coloring Material)

C.I. Direct Yellow: 8, 11, 12, 27, 28, 33, 39, 44, 50, 58, 85, 86, 87, 88, 89, 98, 100, 110, and 132.

C.I. Acid Yellow: 1, 3, 7, 11, 17, 23, 25, 29, 36, 38, 40, 42, 44, 76, 98, and 99.

C.I. Reactive Yellow: 2, 3, 17, 25, 37, and 4.

C.I. Food Yellow: 3.

The compounds as shown in the following formula (I).

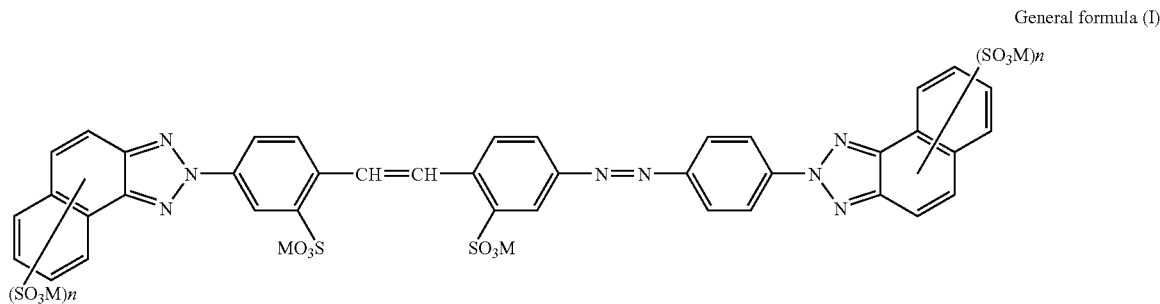

General formula (I)

(In the General formula (I), M's each independently represents a hydrogen atom, an alkali metal, an alkali earth metal, a cation of an organic amine or ammonium ion, and n's each independently represents 1 or 2.)

In the general formula (I), M's each independently represent a hydrogen atom, an alkali metal, an alkali earth metal, or a cation or ammonium ion of an organic amine. Specific examples of the alkali metal include sodium, potassium, and lithium. Specific examples of the alkali earth metal include calcium and magnesium. Specific examples of the organic amine include methylamine, ethylamine, monoethanolamine, diethanolamine, triethanolamine, monoisopropanolamine, and diisopropanolamine. In the present invention, it is preferable that M's each represent a hydrogen atom, an alkali metal such as sodium, potassium or lithium, an ammonium ion, or an alkanolamine ion such as a monoethanolamine ion, a diethanolamine ion or a triethanolamine ion.

Specific examples of the compound represented by the general formula (I) include compounds each having a structure shown in Table 1 below. The present invention is not limited thereto. In Table 1, for convenience, the substitution position of a sulfone group is represented as a position(s) of an A ring or a B ring as shown in the following general formula (II). The substitution position of a sulfone group is as defined in the following general formula (II).

TABLE 1

|  |  | Position of substituent | |
| --- | --- | --- | --- |
|  |  | Ring A | Ring B |
| Exemplified Compound | Y1 | 2 | 4 |
|  | Y2 | 4 | 4 |
|  | Y3 | 2 | 4, 6 |
|  | Y4 | 4, 6 | 4 |

A preferable specific example of the compound represented by the general formula (I) is Exemplified Compound Y1 shown below. The present invention is not limited thereto.

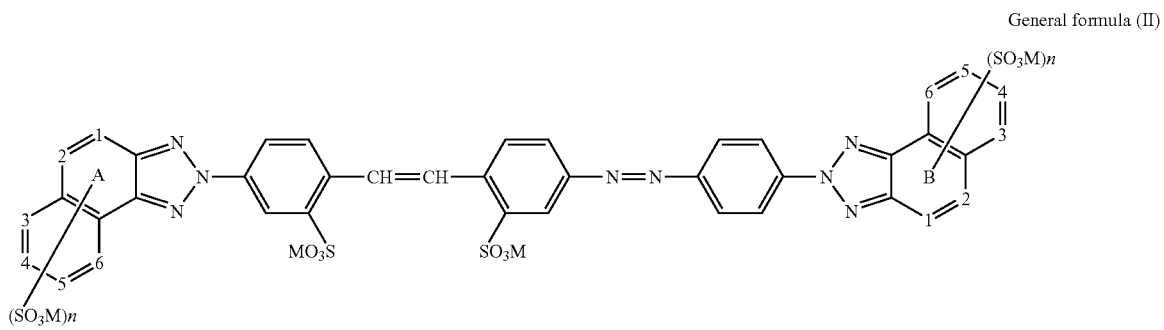

General formula (II)

Exemplified Compound Y1

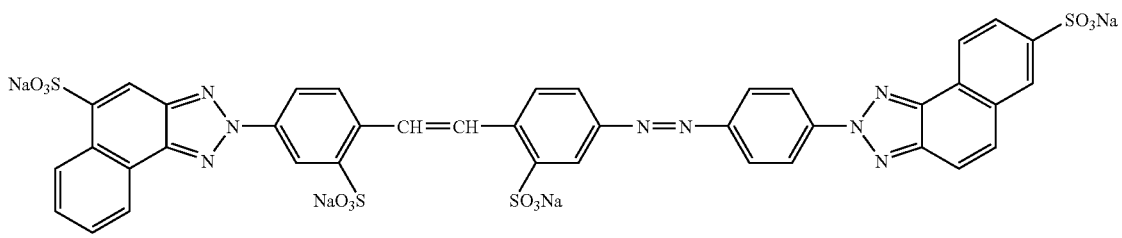

(Magenta Coloring Material)

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, and 230.

C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, and 289.

C.I. Food Red: 87, 92, and 94.

C.I. Direct Violet: 107.

A compound represented by the following general formula (III) or a salt thereof:

General Formula (III)

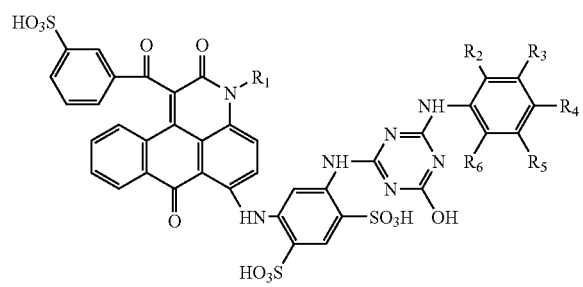

(In the General formula (III), $R_1$ represents a hydrogen atom, an alkyl group, a hydroxyalkyl group, a cyclohexyl group, a monoalkylaminoalkyl or dialkylaminoalkyl group, or a cyanoalkyl group, and $R_2$, $R_3$, $R_4$, $R_5$, and $R_6$ each independently represent a hydrogen atom, an alkyl group having 1 to 8 carbon atoms, or a carboxyl group, provided that all of $R_2$, $R_3$, $R_4$, $R_5$, and $R_6$ are not simultaneously a hydrogen atom.)

Exemplified Compounds M1 to M7 shown below are preferable examples of the compound represented by the general formula (III) or the salt thereof. The present invention is not limited to the above. Although all solubilizing groups in Exemplified Compounds M1 to M7 shown below are each described as an H type, each of the groups may form a salt.

Exemplified Compounds

Exemplified Compound M1

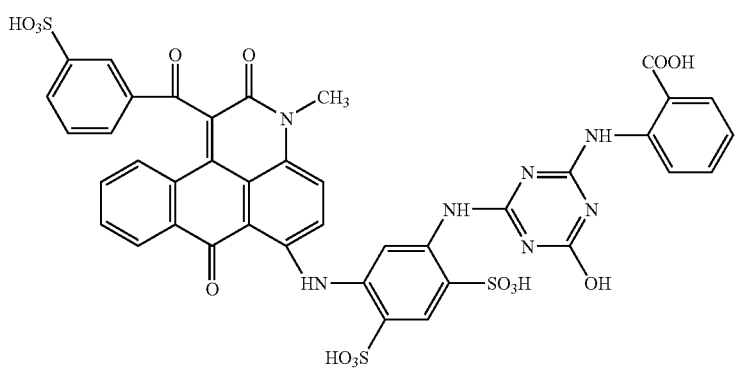

-continued
Exemplified Compound M2
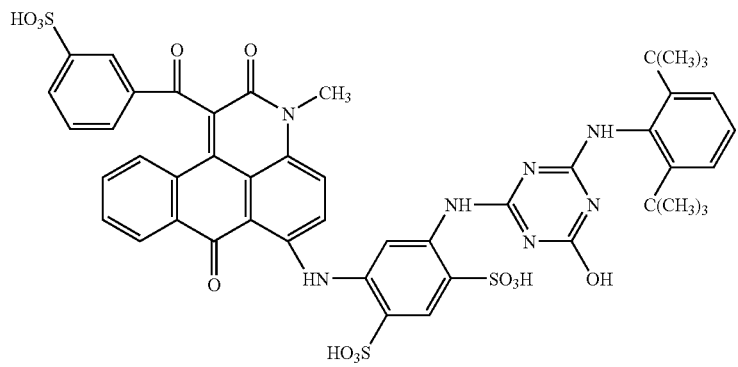
Exemplified Compound M3
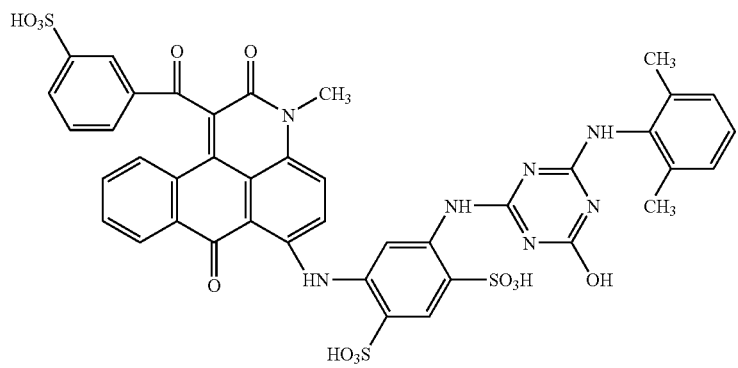
Exemplified Compound M4
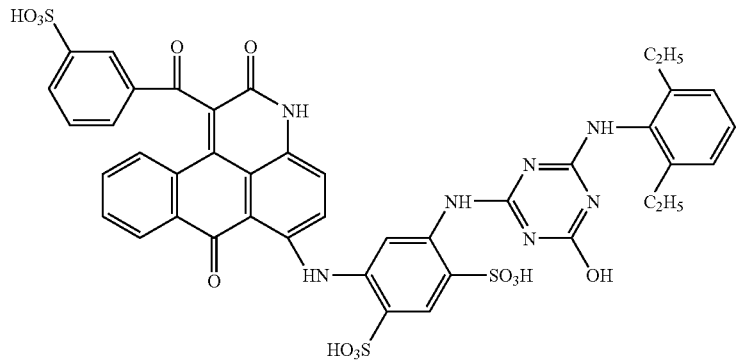
Exemplified Compound M5
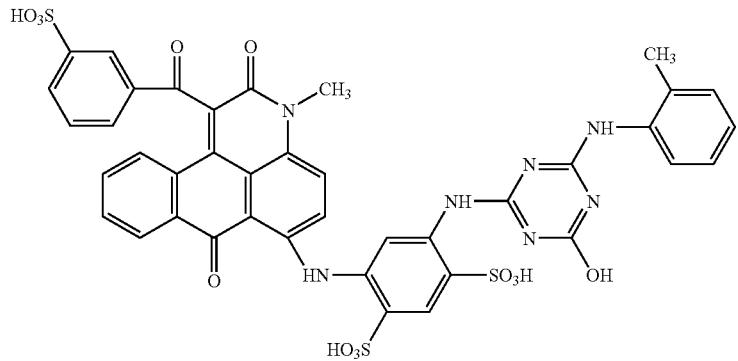

-continued

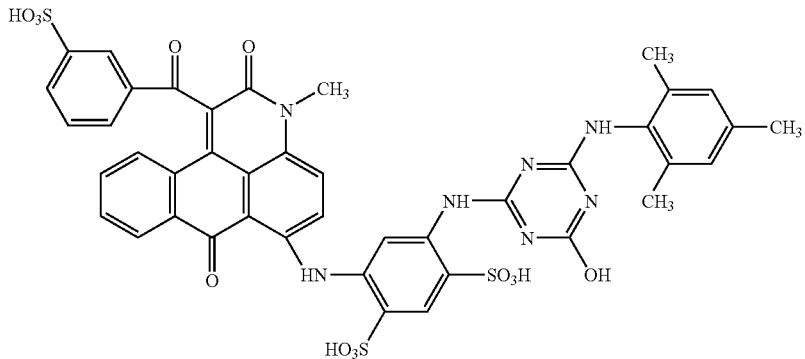
Exemplified Compound M6

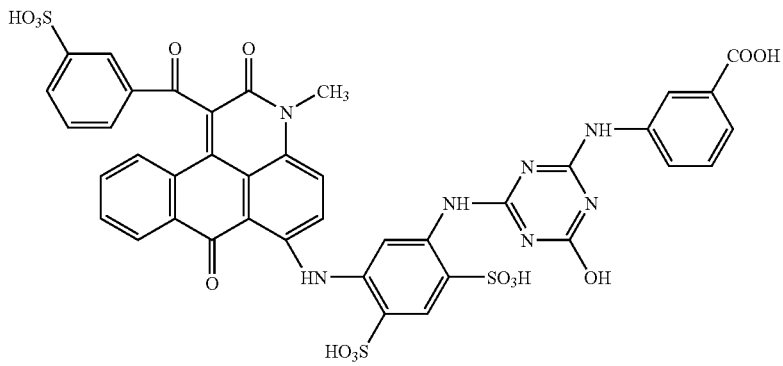
Exemplified Compound M7

A preferable specific example of the compound represented by the general formula (III) or the salt thereof is Exemplified Compound M1 (sodium salt) shown below as a sodium salt of Exemplified Compound M1. The present invention is not limited thereto.

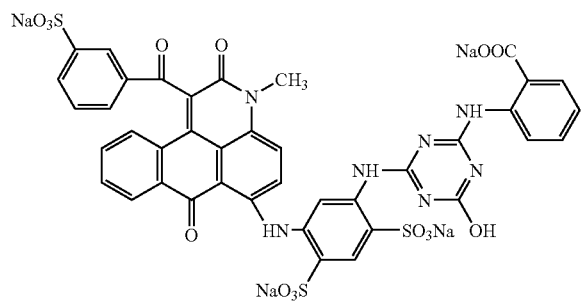
Exemplified Compound M1 (sodium salt)

(Cyan Coloring Material)

C.I. Direct Blue: 1, 15, 22, 25, 41, 76, 77, 80, 86, 90, 98, 106, 108, 120, 158, 163, 168, 199, 226, and 307.

C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, and 244.

A compound represented by the following general formula (IV):

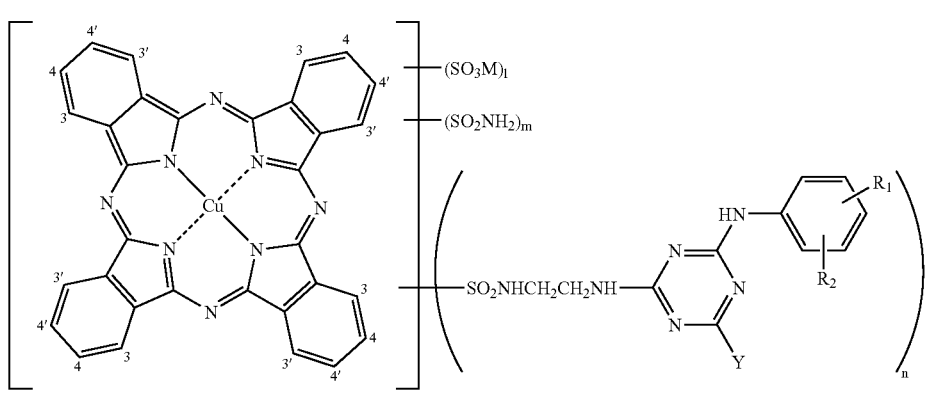

General formula (IV)

(In the General formula (IV), M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a mono- or dialkyl-amino group; l represents 0 to 2, m represents 1 to 3, and n represents 1 to 3 (provided that l+m+n=3 to 4); and a substitution position of a substituent is 4 position or 4' position.)

In the general formula (IV), M represents an alkali metal or an ammonium. Specific examples of the alkali metal include sodium, potassium, and lithium.

The coloring material represented by the general formula (IV) to be used in the present invention is a phthalocyanine derivative obtained by selectively introducing an unsubstituted sulfamoyl group (—SO$_2$NH$_2$) or a substituted sulfamoyl group (a group represented by the general formula (V)) only at 4 position and 4' position in the general formula (IV). The compound represented by the general formula (IV) or the salt thereof to be used in the present invention is synthesized by using as a raw material a phthalocyanine compound obtained by allowing a 4-sulfophthalic acid derivative, or a 4-sulfophthalic acid derivative and a phthalic (anhydride) derivative to react in the presence of a metal compound. The compound or the salt thereof is obtained by transforming a sulfonic group in the phthalocyanine compound into a chlorosulfonic group and allowing an aminating agent to react in the presence of an organic amine.

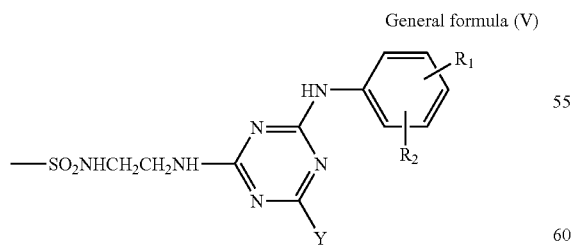

General formula (V)

Preferable specific examples of the substituted sulfamoyl group represented by the general formula (V) are shown below. The present invention is not limited thereto. The substituted sulfamoyl group represented by the general formula (IV) is shown in the form of a free acid.

Exemplified Substituent

Exemplified Substituent 1

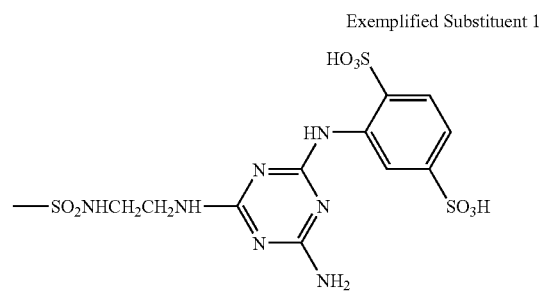

Exemplified Substituent 2

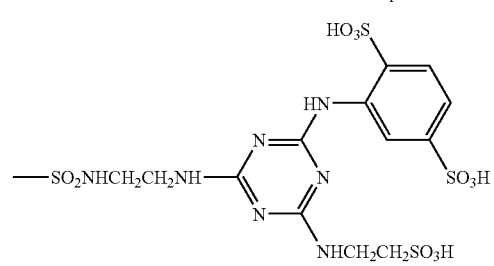

Exemplified Substituent 3

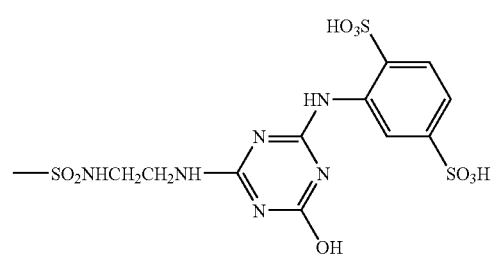

Exemplified Substituent 4

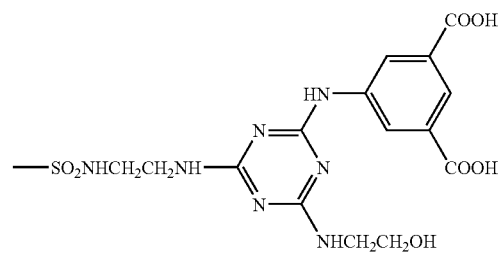

-continued

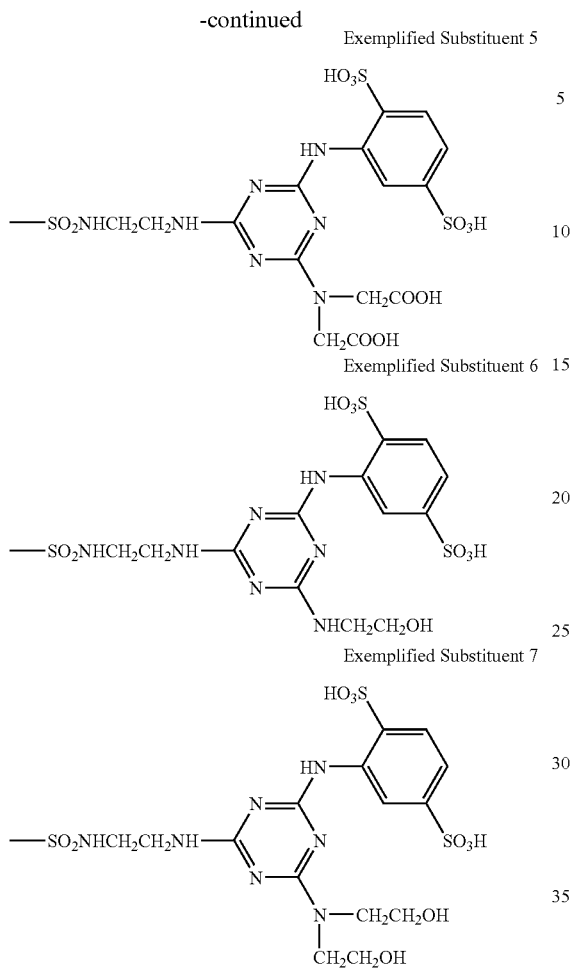

Exemplified Substituent 5

Exemplified Substituent 6

Exemplified Substituent 7

A preferable specific example of the compound represented by the general formula (V) is a compound substituted by Exemplified Substituent 1 shown above, i.e., Exemplified Compound C1 shown below, because of the balance between color developability and resistance to environmental gas. The present invention is not limited to the above.

(Red Coloring Material)

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, and 230.

C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, and 289.

C.I. Reactive Red: 7, 12, 13, 15, 17, 20, 23, 24, 31, 42, 45, 46, and 59.

C.I. Food Red: 87, 92, and 94.

(Green Coloring Material)

C.I. Acid Green: 1, 3, 5, 6, 9, 12, 15, 16, 19, 21, 25, 28, 81, and 84.

C.I. Direct Green: 26, 59, and 67.
C.I. Food Green: 3.
C.I. Reactive Green: 5, 6, 12, 19, and 21.

(Blue Coloring Material)

C.I. Direct Blue: 1, 15, 22, 25, 41, 76, 77, 80, 86, 90, 98, 106, 108, 120, 158, 163, 168, 199, and 226.

C.I. Acid Blue: 1, 7, 9, 15, 22, 23, 25, 29, 40, 43, 59, 62, 74, 78, 80, 90, 100, 102, 104, 117, 127, 138, 158, and 161.

C.I. Reactive Blue: 4, 5, 7, 13, 14, 15, 18, 19, 21, 26, 27, 29, 32, 38, 40, 44, and 100.

(Black Coloring Material)

C.I. Direct Black: 17, 19, 22, 31, 32, 51, 62, 71, 74, 112, 113, 154, 168, and 195.

C.I. Acid Black: 2, 48, 51, 52, 110, 115, and 156.

C.I. Food Black: 1 and 2.

A compound represented by the following general formula (VI) or a salt thereof:

Exemplified Compound C1

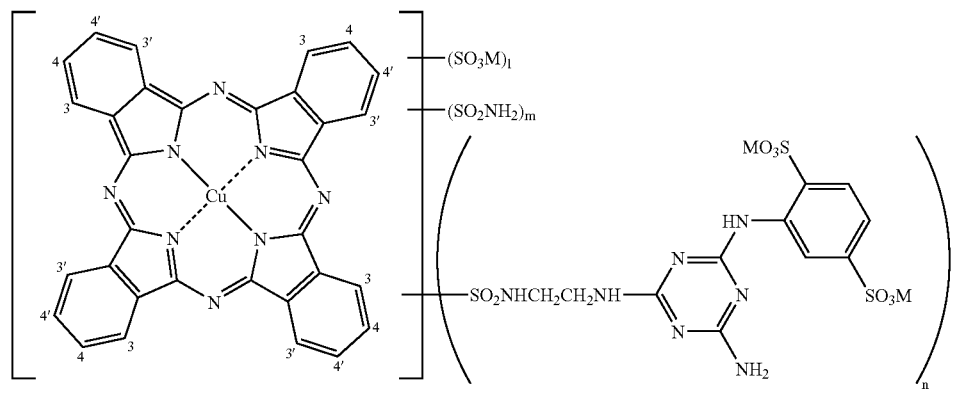

General formula (VI)

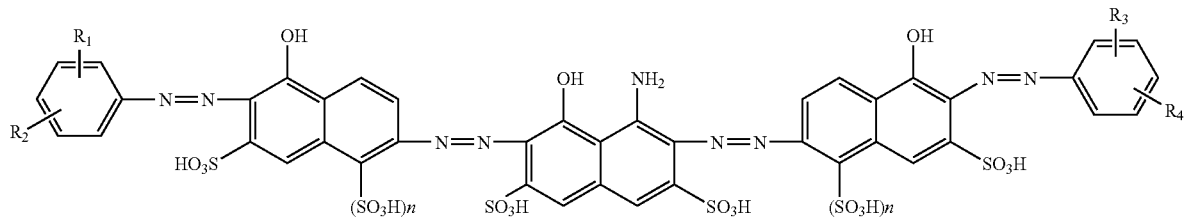

(In the General formula (VI), $R_1$, $R_2$, $R_3$, and $R_4$ each independently represent: a hydrogen atom; a hydroxyl group; an amino group; a carboxyl group; a sulfonic group; an alkyl group having 1 to 4 carbon atoms; an alkoxy group having 1 to 4 carbon atoms; an alkoxy group substituted by a hydroxyl group, an alkoxy group having 1 to 4 carbon atoms, a sulfonic group, or a carboxyl group; an alkoxy group having 1 to 4 carbon atoms which may be substituted by a carboxyl group or a sulfonic group; or an amino group substituted by a phenyl group, an alkyl group, or an acyl group, and n represents 0 or 1.) It should be noted that n=0 in the general formula (VI) means that H is placed at the position at which $SO_3H$ should be placed.

A compound represented by the following general formula (VII) or a salt thereof:

General formula (VII)

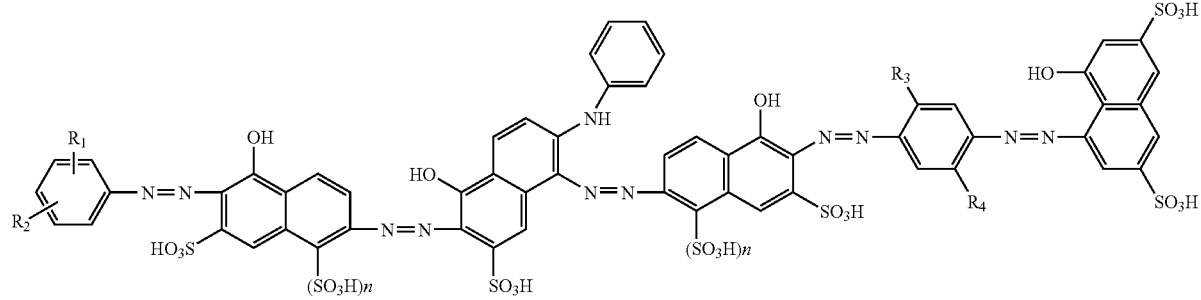

(In the General formula (VII), $R_1$ and $R_2$ each independently represent: a hydrogen atom; a hydroxyl group; an amino group; a carboxyl group; a sulfonic group; an alkyl group having 1 to 4 carbon atoms; or an alkoxy group having 1 to 4 carbon atoms, $R_3$ and $R_4$ each independently represent: a hydrogen atom; an alkyl group having 1 to 4 carbon atoms; an alkoxy group having 1 to 4 carbon atoms; a hydroxyl group; an alkyl group having 1 to 4 carbon atoms which may be substituted by a hydroxyl group or an alkoxy group having 1 to 4 carbon atoms; an alkoxy group having 1 to 4 carbon atoms which may be substituted by a hydroxyl group, an alkoxy group having 1 to 4 carbon atoms, a sulfonic group, or a carboxyl group; or an amino group substituted by an alkyl group or an acyl group, and n represents 0 or 1.) It should be noted that n=0 in the general formula (VII) means that H is placed at the position at which $SO_3H$ should be placed.

A condensed dye composed of 4,4'-dinitrostilbene-2,2'-disulfonic acid represented by the following general formula (VIII) and a compound represented by the following general formula (IX), a dye obtained by the reduction of the condensed dye (a counter ion of the dye after condensation or reduction is a hydrogen ion, an alkali metal ion, or a cation or ammonium ion of an organic amine), or a salt thereof:

General formula (VIII)

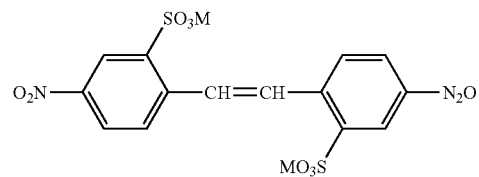

(In the General formula (VIII), M represents a hydrogen atom or an alkali metal atom.)

General formula (IX)

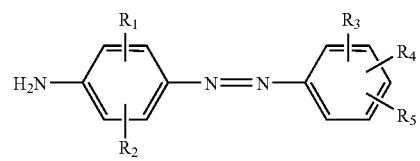

(In the General formula (IX), $R_1$, $R_2$, $R_3$, $R_4$, and $R_5$ each independently represent: a hydrogen atom; a halogen atom; a hydroxyl group; a sulfonic group; a carboxyl group; an alkyl group having 1 to 4 carbon atoms; or an alkoxy group having 1 to 4 carbon atoms.)

In the present invention, it is particularly preferable that the compound represented by the general formula (VI) or the salt thereof is Exemplified Compound Bk1, and the compound represented by the general formula (VII) or the salt thereof is Exemplified Compound Bk2. Further, the condensed dye composed of the compound represented by the general formula (VIII) and the compound represented by the general formula (IX) is particularly preferably C.I. Direct Orange 39.

similar to those of the above-mentioned reactive ink. Dyes are preferably used as coloring materials for the other inks.

(Cap)

The pigment ink according to the present invention should be used in an ink jet recording apparatus in which an ejection

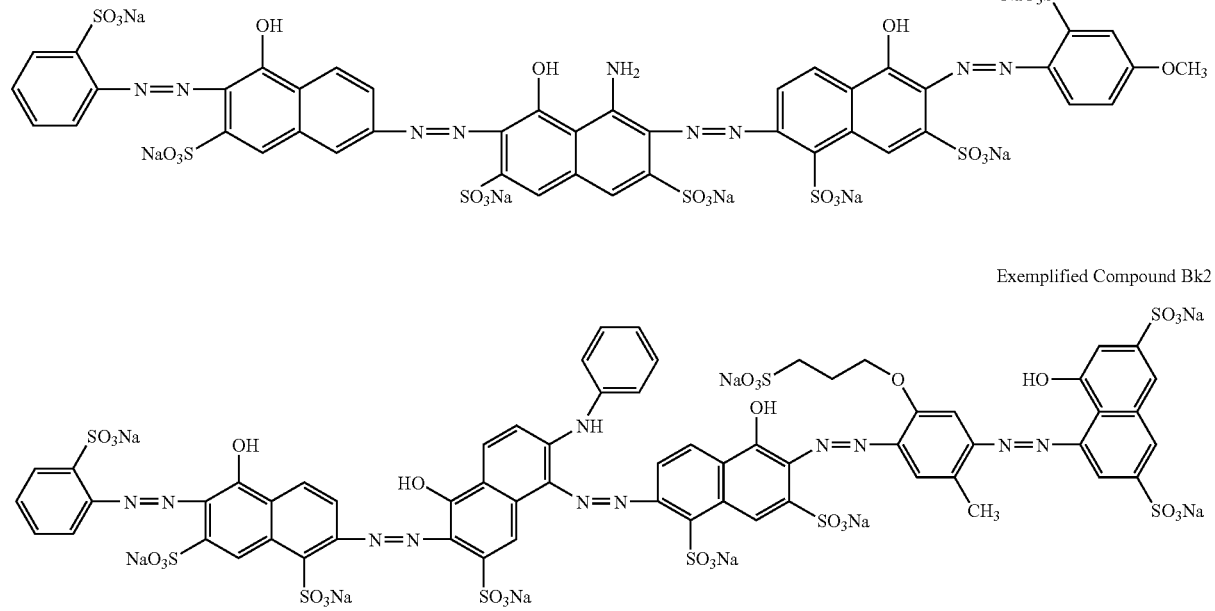

(Aqueous Medium)

Water, or an aqueous medium as a mixed solvent of water and a water-soluble organic solvent is preferably used in the reactive ink. Specifically, an aqueous medium to be used in the reactive ink has the same constitution as an aqueous medium to be used in the pigment ink. The content (mass %) of the water-soluble organic solvent in the reactive ink is preferably 3.0 mass % or more and 50.0 mass % or less with respect to the total mass of the reactive ink. In addition, the content (mass %) of water in the reactive ink is preferably 50.0 mass % or more and 95.0 mass % or less with respect to the total mass of the reactive ink.

(Other Components)

The reactive ink may use a moisture-retaining compound such as urea, a urea derivative, trimethylolpropane or trimethylolethane for maintaining moisture retentivity in addition to the above-mentioned components. Further, the reactive ink may contain various compounds as required in addition to the above-mentioned components so as to have desired physical property values. Compounds usable in this case are the same as in the pigment ink.

(Other Inks)

In the present invention, other inks can be used in combination with the pigment ink and the reactive ink. The "other inks" referred to in the present invention include inks free of any polyvalent metal or the like, i.e., inks that do not react with the pigment ink (non-reactive ink). The non-reactive ink preferably contains at least a coloring material and an aqueous medium, and the contents of such components can be orifice for the pigment ink and an ejection orifice for a reactive ink that destabilizes the dispersed state of a pigment in the pigment ink are capped with the identical cap. In addition, the ink jet recording apparatus should have a unit for removing an ink in the cap. In the present invention, the unit for removing an ink in the cap is preferably a unit for removing an ink in the cap by joining a tube connected to a suction pump to the cap. In addition, the cap preferably has a member for absorbing an ink in the cap. The use of an in-cap absorber as the member for absorbing an ink enables the effect of the present invention to be additionally significantly exhibited.

Figure 8:
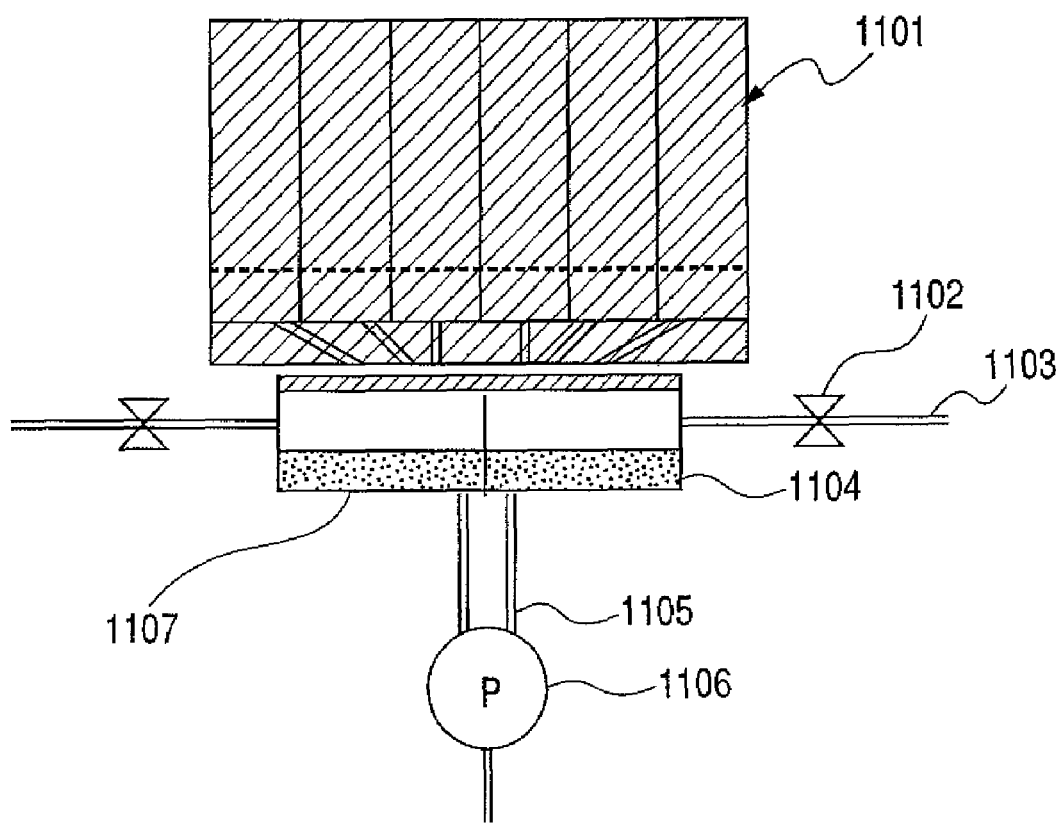
FIG. 8 is a schematic view showing the relationship between a recording head and a cap.

FIG. 8 is a schematic view showing the relationship between a recording head and a cap. An ink jet recording apparatus sucks an ink by reducing the pressure in a cap 1107 for capping a recording head 1101 with a suction pump 1106. After that, the ink is sucked through an ink absorber 1104 and a recovery tube 1105 so as to be a waste ink. The pressure in the cap 1107 in a decompressed state is slowly returned to the atmospheric pressure by using a communication valve 1102 and an air communication hole 1103. The recovery tube 1105 may be placed anywhere in the cap 1107. However, the tube is preferably placed near the center between ejection orifices for a pigment ink and a reactive ink in order that color mixing upon suction of the pigment ink and the reactive ink may be reduced. The present invention is not limited to the constitution shown in FIG. 8.

(Image Forming Method)

The pigment ink according to the present invention is preferably applied to an image forming method in which an image is formed including an image formed from a reactive ink and an image formed from the pigment ink which are adjacent to each other. The pigment ink according to the present invention is particularly preferably applied to an image forming method including: ejecting a pigment ink; ejecting at least one type of reactive ink that destabilizes the dispersed state of a pigment in the pigment ink; and capping an ejection orifice for the pigment ink and an ejection orifice for the reactive ink with the identical cap to remove an ink in the cap. In the image forming method according to the present invention, image quality can be improved by applying the pigment ink and the reactive ink that destabilizes the dispersed state of the pigment in the pigment ink according to an ink jet recording method so that the inks mix with each other on a recording medium. In addition, the occurrence of bleeding can be suppressed even in an image in which a region formed as described above and a region formed by any other ink are adjacent to each other. Further, in an image in which a region formed by the pigment ink and a region formed by the reactive ink are adjacent to each other, the occurrence of bleeding at a boundary portion between these regions can be suppressed.

The manner in which the pigment ink and the reactive ink are mixed is, for example, such that the pigment ink and the reactive ink in liquid states contact and mix with each other. To be specific, the manner may include at least one of a step of applying the pigment ink to the recording medium after the reactive ink and a step of applying the reactive ink to the recording medium after the pigment ink.

In addition, the manner in which the pigment ink and the reactive ink are mixed in the present invention is not limited to such a manner that the inks are mixed in liquid states. For example, the manner may include at least one of a step of applying the pigment ink to the recording medium after the permeation of the reactive ink into the recording medium and a step of applying the reactive ink to the recording medium after the permeation of the pigment ink into the recording medium. In the present invention, even in the manner, the pigment ink and the reactive ink are regarded as being mixed inasmuch as the action of the reactive ink exhibits the effect of destabilizing the dispersed state of the pigment in the pigment ink. The image forming method according to the present invention preferably includes adjusting the color tone of an image as required.

Upon formation of an image, the ejected volume of each of the pigment ink and the reactive ink is preferably small. This is due to the following reason: as the ejected volume becomes smaller, an area per dot upon application of ink to a recording medium becomes smaller, so that the degree of freedom in dot arrangement upon application of a certain amount of ink to a certain region of the recording medium can be increased. As a result, the pigment ink and the reactive ink can be allowed to effectively react with each other. Thus, image quality can be additionally improved even when a set of inks equal to each other in mixed thickening ratio is used.

(Ink Jet Recording Method)

The reactive ink and the pigment ink described above are particularly suitably used for an ink jet recording method including the step of ejecting the ink by means of an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

(Ink Set)

The pigment ink according to the present invention is preferably applied to an ink set having plural inks. An ink set having the above-described pigment ink and reactive ink is particularly preferable.

The category of the ink set includes the case where a plurality of independent ink cartridges are used in combination as well as an ink cartridge itself in which plural ink cartridges are integrated with each other, and besides, includes an integrated product of the ink cartridge and a recording head.

The cases where the ink cartridge is used in combination with another ink cartridge as described below may also be cited as examples of the ink set of the present invention: the case where the ink cartridge is used in combination with another ink cartridge storing a black ink and the case where the ink cartridge is used in combination with an ink cartridge obtained by integrating ink cartridges each storing a black ink, a light cyan ink, or a light magenta ink.

Further, specific examples of the case where a plurality of independent ink cartridges are used in combination in the ink set include: the case where independent ink cartridges respectively storing a cyan ink, a magenta ink and a yellow ink are used in combination with another ink cartridge storing a black ink; the case where ink cartridges respectively storing a black ink, a light cyan ink and a light magenta ink are used in combination; the case where an independent ink cartridge storing a red ink is additionally used; and the case where an independent ink cartridge storing a green ink is additionally used.

The ink set is particularly preferably in such a form that an independent ink cartridge and another ink cartridge storing a black ink are used in combination.

(Ink Cartridge)

As an ink cartridge suitable for performing ink jet recording by using the above-mentioned reactive ink and pigment ink, one is cited including ink storage portions for storing these inks. Hereinafter, a specific example of the ink cartridge will be described.

Figure 9:
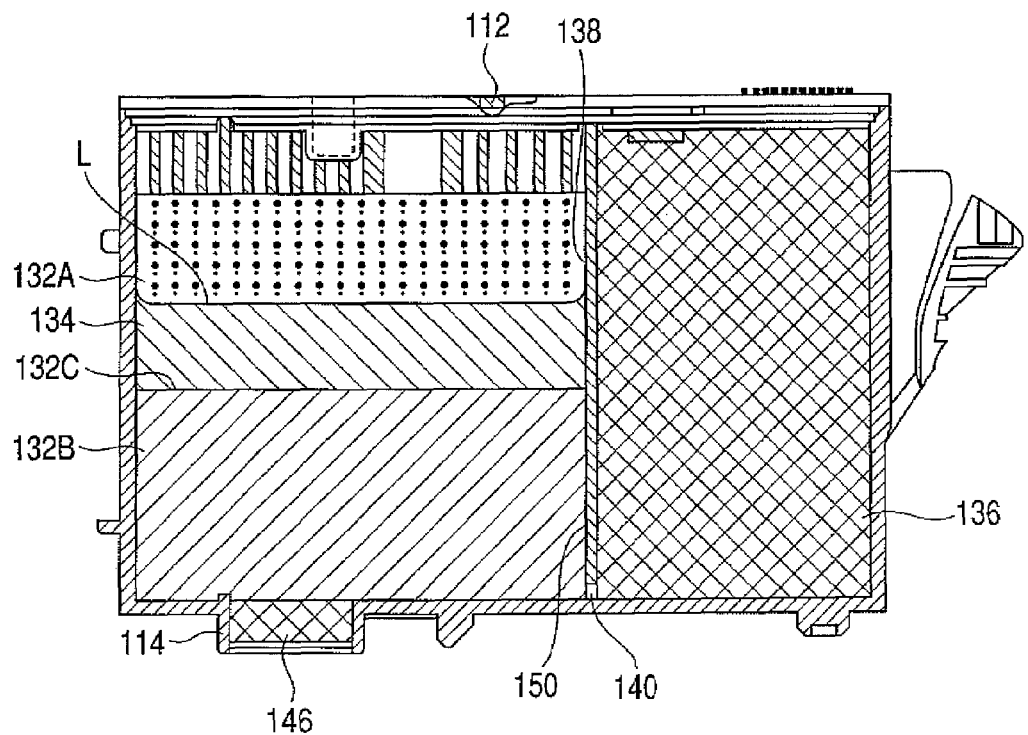
FIG. 9 is a schematic explanatory view showing an ink cartridge.

FIG. 9 is a schematic explanatory view showing an ink cartridge. In FIG. 9, the upper portion of the ink cartridge is in communication with the air through an air communication port 112, and the lower portion of the cartridge is in communication with an ink supply port. The ink cartridge has such a structure that a negative pressure generating member holding chamber 134 for storing negative pressure generating members and a substantially sealed liquid storing chamber 136 for storing liquid ink are partitioned by a partition 138. The negative pressure generating member holding chamber 134 and the liquid storing chamber 136 are in communication with each other only through a communication hole 140 formed in the partition 138 near the bottom portion of the ink cartridge and an air introduction groove (air introduction path) 150 for promoting the introduction of the air into the liquid storing chamber at the time of a liquid supplying operation. The upper wall of the ink cartridge from which the negative pressure generating member holding chamber 134 is formed has plural ribs integrally molded so as to protrude toward the inside of the cartridge, and the ribs are in contact with a negative pressure generating member stored in a compressed state in the negative pressure generating member holding chamber 134. Air buffer chambers are formed by the ribs between the upper wall and the upper surface of the negative pressure generating member. In addition, an ink supply cylinder with a liquid supply port 114 is provided with a press contact body 146 which has capillary force and physical strength higher than the negative pressure generating member, and is brought into pressure contact with the other negative pressure generating member.

The negative pressure generating member holding chamber 134 stores, as the negative pressure generating members, two capillary force generating type negative pressure generating members: a first negative pressure generating member 132B and a second negative pressure generating member 132A each formed from fibers of an olefin-based resin such as polyethylene. The intersection of a boundary layer 132C between the two negative pressure generating members with the partition 138 is present above the upper end portion of the air introduction groove (air introduction path) 150 in such a posture of the ink cartridge at the time of use that the portion through which the negative pressure generating member holding chamber 134 and the liquid storing chamber 136 are in communication with each other is placed downward. In addition, the ink stored in the negative pressure generating members reaches a portion above the boundary layer 132C as indicated by a liquid surface L of the ink.

The first negative pressure generating member 132B and the second negative pressure generating member 132A are brought into pressure contact with each other at the boundary layer, so that compressibility near the boundary layer between the negative pressure generating members is higher than any other sites, and capillary force near the boundary layer is stronger than any other sites. That is, capillary force P1 of the first negative pressure generating member 132B, capillary force P2 of the second negative pressure generating member 132A, and capillary force PS of the interface between the negative pressure generating members can be arranged as follows: P2<P1<PS.

Figure 10:
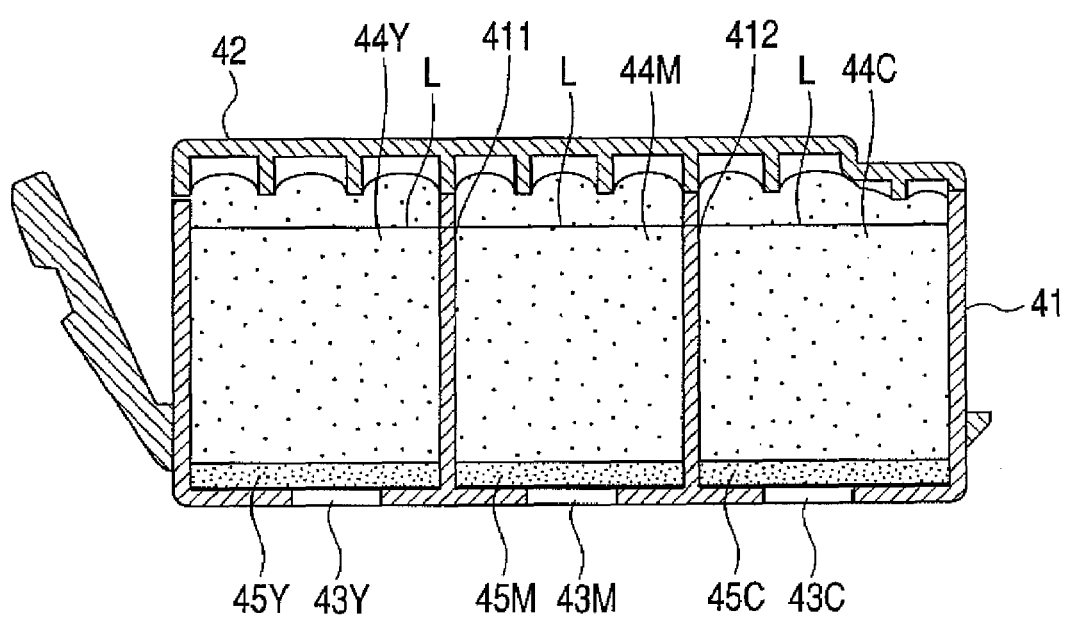
FIG. 10 is a schematic explanatory view showing an ink cartridge.

FIG. 10 is a schematic explanatory view showing another form of an ink cartridge. The ink cartridge having the form shown in FIG. 10 has: a container 41 for storing three kinds of inks, for example, a pigment ink, a reactive ink having the same hue as the pigment ink, and an ink having a hue different from the pigment ink; and a lid member 42 for covering the container 41. The ink cartridge has a supply port for each of the pigment ink, the reactive ink having the same hue as the pigment ink, and the ink having a hue different from the pigment ink: a pigment ink supply port 43Y, a supply port 43M for the reactive ink having the same hue as the pigment ink, and a supply port 43C for the ink having a hue different from the pigment ink. The inside of the container 41 is partitioned by two partitions 411 and 412 placed in parallel with each other into three spaces having substantially equal volumes so that three types of inks can be stored. Those three spaces are arranged along the direction in which the ink cartridge is inserted upon mounting the ink cartridge on an ink cartridge holder. Those spaces store an ink absorber 44Y for absorbing and holding the pigment ink, an ink absorber 44M for absorbing and holding the reactive ink having the same hue as the pigment ink, and an ink absorber 44C for absorbing and holding the ink having a hue different from the pigment ink, respectively. In addition, ink supplying members 45Y, 45M, and 45C for supplying the respective inks to the ink supply ports are each stored so as to be in contact with the lower portion of the corresponding ink absorber. The ink stored in each of the ink absorbers 44Y, 44M, and 44C as negative pressure generating members reaches a portion above the ink absorber as indicated by the liquid surface L of the ink.

(Recording Unit)

As an example of a recording unit suitable for performing recording by means of the reactive ink and the pigment ink as described above, a recording unit is cited including an ink storage portion for storing the ink and a recording head. In particular, the recording unit in which the recording head applies thermal energy corresponding to recording signals to the ink to generate ink droplets may be exemplified.

(Ink Jet Recording Apparatus)

An ink jet recording apparatus capable of performing bi-directional recording as an ink jet recording apparatus suitable for performing recording by using the above-mentioned reactive ink and pigment ink will be described with reference to FIGS. 11 and 12.

Figure 11:
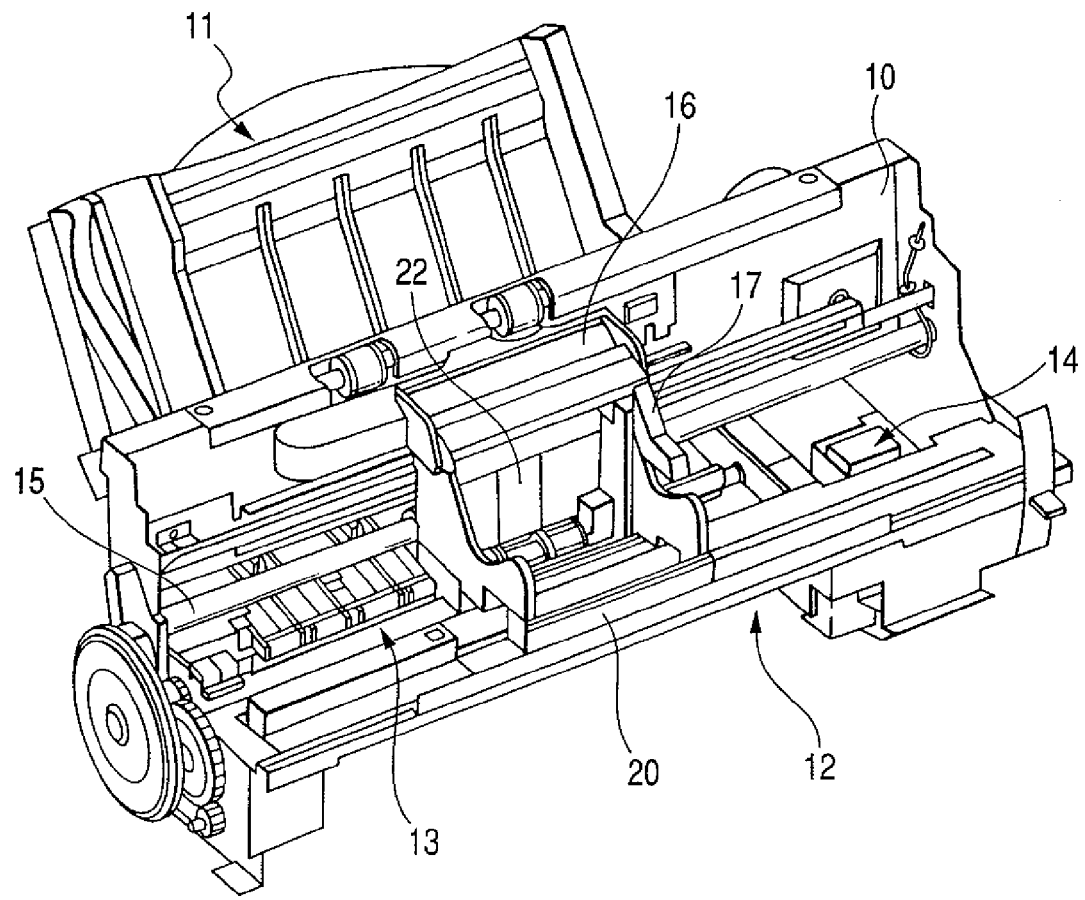
FIG. 11 is a schematic view showing an example of an ink jet recording apparatus.

FIG. 11 is a schematic explanatory view showing an example of the ink jet recording apparatus. A chassis 10 is composed of plural plate-like metallic members each having predetermined rigidity, and constitutes the base structure of the ink jet recording apparatus. A feeding portion 11 for feeding a recording medium, a conveying portion 13 for introducing the recording medium to a predetermined recording position and for introducing the recording medium to a discharge portion 12, a print portion for performing predetermined recording on the recording medium, and a head recovery portion 14 for performing a recovery action on the print portion are incorporated into the chassis 10. The print portion has a carriage 16 supported along a carriage axis 15 so as to be capable of scanning, a head cartridge detachably mounted on the carriage 16 through a head set lever 17, and a carriage cover 20 for positioning the head cartridge at a predetermined mounting position. One end portion of a contact flexible print cable (hereinafter abbreviated as "contact FPC") 22 is connected to another engaging portion of the carriage 16 with respect to the head cartridge. A contact portion (not shown) formed at the one end portion of the contact FPC 22 and a contact portion 301 as an external signal input terminal provided for the head cartridge are brought into electrical contact with each other so that the exchange of various pieces of information, the supply of electric power to the head cartridge, and the like are performed.

Figure 12:
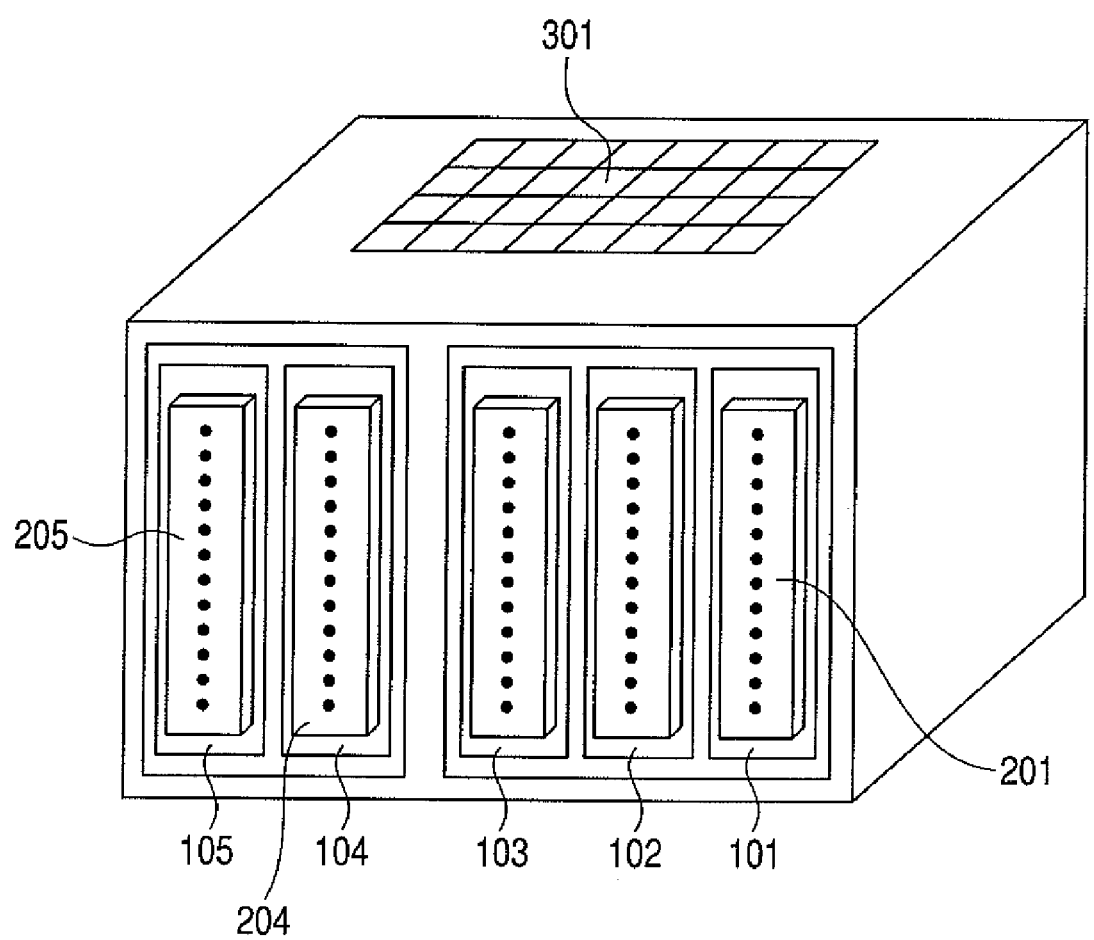
FIG. 12 is a schematic view showing an example of a recording head cartridge.

FIG. 12 is a schematic explanatory view showing an example of the head cartridge. Taking as an example of an ink set a case where a non-reactive yellow ink, a non-reactive magenta ink, a strongly reactive cyan ink, a pigment black ink, and a weakly reactive black ink are used, description will be given below. In FIG. 12, reference characters 101, 102, 103, 104, and 105 represent a recording head for the strongly reactive cyan ink, a recording head for the non-reactive magenta ink, a recording head for the non-reactive yellow ink, a recording head for the pigment black ink, and a recording head for the weakly reactive black ink, respectively. In addition, taking as examples an ejection orifice line 201 for the strongly reactive cyan ink and an ejection orifice line 205 for the weakly reactive black ink, description will be given. In the recording head shown in FIG. 12, electrical signals such as recording signals are exchanged through electrical contact 301. Reference character 204 in FIG. 12 represents an ejection orifice line for the pigment black ink.

Two or more recording heads can be used in one ink jet recording apparatus as required from the viewpoints of, for example, the number of inks to be used and operability. In this case, ejection orifices to be capped with the identical cap are preferably arranged in the identical recording head from the viewpoints of the suppression of the evaporation of ink from a nozzle and the efficiency of a sucking operation.

Description has been made taking, as an example of an embodiment of a recording head, a recording head according to a BUBBLE JET (registered trademark) method that performs recording by means of an electrothermal transducer (recording element) for generating thermal energy inducing ink to generate film boiling in accordance with an electrical signal. It is preferable to apply the basic principles disclosed in, for example, descriptions of U.S. Pat. Nos. 4,723,129 and 4,740,796 to the representative structure and principle of a BUBBLE JET method. The method is applicable to any one of the so-called on-demand type and continuous type. In the case of the on-demand type, at least one driving signal which corresponds to recording information and causes a sudden increase in temperature exceeding nuclear boiling is applied to an electrothermal transducer, to thereby allow the electrothermal transducer to generate thermal energy. As a result, the thermal action surface of a recording head is allowed to generate film boiling and one air bubble can be formed in the liquid (ink) for each driving signal. According to the growth and contraction of the air bubble, the ink is ejected through an opening for ejection, thereby forming an ink droplet. The driving signal is more preferably of a pulse shape because the growth and contraction of an air bubble can be performed immediately and appropriately, and hence the ink can be ejected with excellent responsiveness.

An example of the second embodiment of an ink jet recording apparatus utilizing mechanical energy includes a nozzle forming substrate having plural nozzles, pressure generating elements arranged opposite the nozzles and composed of a piezoelectric material and a conductive material, and ink with which the surroundings of the pressure generating elements are filled. In this embodiment, the pressure generating element is displaced by an applied voltage to eject ink droplets.

Both an ink jet recording apparatus in which a recording head and an ink cartridge are separated and an ink jet recording apparatus in which a recording head and an ink cartridge are inseparably integrated can be used. The ink cartridge may be separably or unseparably integrated with the recording head to be mounted on a carriage, or may be mounted to a fixing portion of an ink jet recording apparatus to supply ink to a recording head through an ink supply member such as a tube. When the ink cartridge is provided with a constitution for applying a preferable negative pressure to the recording head, it can have the following constitutions: a constitution in which an absorber may be arranged in an ink storage portion of the ink tank, and a constitution in which the ink cartridge has a flexible ink storage bag and a spring portion for applying bias to expand the internal volume of the bag. The ink jet recording apparatus may adopt a serial recording method as described above, or may be in the form of a line printer in which recording elements are aligned over the range corresponding to the entire width of a recording medium.

EXAMPLES

Hereinafter, the present invention will be described more specifically by way of examples and comparative examples. However, the present invention is by no means limited to these examples without departing from the gist of the present invention. The term "%" in the following description means "mass %" unless otherwise specified.

(Preparation of Pigment Ink)

(Preparation of Pigment Dispersion Liquid A)

1.5 g of 4-amino-1,2-benzenedicarboxylic acid in a state that it was cooled to 5° C. was added to a solution prepared by dissolving 5 g of concentrated hydrochloric acid in 5.5 g of water. Next, a container containing the solution was placed in an ice bath, and while the temperature of the solution was always kept at 10° C. or lower with stirring, a solution prepared by dissolving 1.8 g of sodium nitrite in 9 g of water at 5° C. was added to the solution. After the solution had been stirred for additional 15 minutes, 6 g of carbon black having a specific surface area of 220 $m^2$/g and a DBP oil absorption of 105 mL/100 g were added to the solution under stirring. After that, stirring was carried out for additional 15 minutes. After the resultant slurry had been filtrated through filter paper (trade name: standard filter paper No. 2; manufactured by ADVANTEC), particles were sufficiently washed with water and dried in an oven at 110° C., whereby Self Dispersion Carbon Black A was prepared. Further, a dispersion liquid having a pigment concentration of 10 mass % was prepared by adding water to Self Dispersion Carbon Black A obtained in the foregoing. According to the foregoing method, Pigment Dispersion Liquid A in a state in which Self Dispersion Carbon Black A with —$C_6H_3$—$(COONa)_2$ group introduced into the surfaces of carbon black particles was dispersed in water was prepared.

The ionic group density of Self Dispersion Carbon Black A prepared in the foregoing was measured and found to be 3.1 $\mu mol/m^2$. A method of measuring the ionic group density adopted in this case was as follows: a sodium ion concentration in Pigment Dispersion Liquid A prepared in the foregoing was measured with an ion meter (manufactured by DKK-TOA CORPORATION), and the measured value was converted into the ionic group density of Self Dispersion Carbon Black A.

(Preparation of Pigment Dispersion Liquid B)

Self Dispersion Carbon Black B was prepared by replacing sodium ions in Pigment Dispersion Liquid A obtained in the foregoing by ammonium ions by an ion exchange method. Further, a dispersion liquid having a pigment concentration of 10 mass % was prepared by adding water to Self Dispersion Carbon Black B obtained in the foregoing. According to the above method, Pigment Dispersion Liquid B in a state in which Self Dispersion Carbon Black B with —$C_6H_3$—$(COONH_4)_2$ groups introduced into the surface of a carbon black particle was dispersed in water was prepared.

The ionic group density of Self Dispersion Carbon Black B prepared in the foregoing was prepared and found to be 3.1 $\mu mol/m^2$.

(Preparation of Ink)

The components shown in Table 2 below were mixed and sufficiently stirred, then filtered through a microfilter (manufactured by FUJIFILM Corporation) having a pore size of 3.0 µm under pressure to prepare a pigment ink.

TABLE 2

|  | Pigment ink |
| --- | --- |
| Pigment Dispersion Liquid B | 35.00 |
| Glycerin | 6.00 |
| Diethylene glycol | 5.00 |
| 2-pyrrolidone | 5.00 |
| Trimethylolpropane | 4.00 |
| Acetylenol E100 (*1) | 0.15 |
| Ammonium sulfate | 0.50 |
| Pure water | 44.35 |

(*1) Ethylene oxide adduct of acetylene glycol (surfactant; manufactured by Kawaken Fine Chemicals Co., Ltd.)

(Preparation of Reactive Ink)

(Synthesis of Exemplified Compound M1)

A compound represented by Compound (1) below, sodium carbonate, and benzoyl ethyl acetate were allowed to react with one another in xylene, and the reaction product was filtered and washed. To the resultant product, m-amino acetanilide, copper acetate and sodium carbonate were sequentially added and allowed to react in N,N-dimethylformamide, and the reaction product was filtered and washed. The resultant product was sulfonated in fuming sulfuric acid, and filtered and washed, then subjected to condensation reaction with cyanuric chloride in the presence of sodium hydroxide. Anthranilic acid was added to the reaction liquid to carry out condensation reaction in the presence of sodium hydroxide. The resultant product was filtered and washed to prepare Exemplified Compound M1 below.

Compound (1)

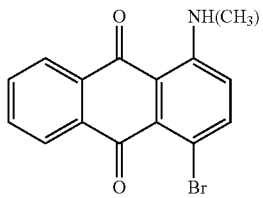

Exemplified Compound M1

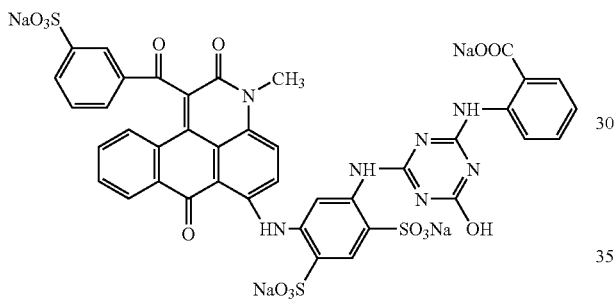

bonate were added to the diazo turbid liquid and stirred overnight, whereby Reaction Liquid A was prepared. Next, 1-amino-2-benzenesulfonic acid was added to and dissolved in water with sodium hydroxide added, and furthermore, an aqueous solution of sodium nitrite was added to the mixture to carry out diazotization. The diazo turbid liquid was dropped in an alkali aqueous solution of 6-amino-1-hydroxynaphthalene-3-sulfonic acid to perform coupling reaction, followed by salting out with sodium chloride. After that, the resultant product was filtrated and washed. Next, the compound was added to and dissolved in water with sodium hydroxide added, and hydrochloric acid and sodium nitrite were added to the mixture to carry out diazotization. The diazo turbid liquid was added to Reaction Liquid A to perform coupling reaction, followed by salting out with sodium chloride. After that, the resultant product was filtrated and washed, whereby Exemplified Compound Bk1 shown below was prepared.

Compound (2)

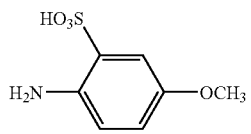

Exemplified Compound Bk1

(Synthesis of Exemplified Compound Bk1)

Compound (2) shown below was added to and dissolved in water with sodium hydroxide added, and furthermore, an aqueous solution of sodium nitrite was added to the mixture to carry out diazotization. The diazo turbid liquid was dropped in an alkali aqueous solution of 6-amino-1-hydroxynaphthalene-3,5-disulfonic acid to perform coupling reaction, followed by salting out with sodium chloride. After that, the resultant product was filtrated and washed. Next, the compound was added to and dissolved in water with sodium hydroxide added, and hydrochloric acid and sodium nitrite were added to the mixture to carry out diazotization. 8-amino-1-hydroxynaphthalene-3,6-disulfonic acid and sodium car- (Synthesis of Exemplified Compound Bk2)

Compound (3) shown below was added to and dissolved in water added with sodium carbonate, and, furthermore, hydrochloric acid and sodium nitrite were added to the mixture to carry out diazotization. An aqueous solution of 6-phenylamino-1-hydroxynaphthalene-3-sulfonic acid was added to the diazo turbid liquid, and was dissolved in the presence of sodium carbonate, whereby Solution B was obtained. Next, 2-aminosulfonic acid was dissolved in the presence of sodium hydroxide, and hydrochloric acid and sodium nitrite were added to the mixture to carry out diazotization. Next, 6-amino-1-hydroxynaphthalene-3-sulfonic acid was dissolved in the presence of sodium hydroxide, and acetic anhydride was added to the mixture to carry out acetylation. The diazo turbid liquid obtained in the foregoing was dropped to the resultant in the presence of sodium carbonate to perform a coupling reaction, whereby Reaction Liquid C was obtained. Sodium hydroxide and sodium chloride in this order were added to Reaction Liquid C to effect salting out, whereby a compound was obtained. This compound was dissolved in water in the presence of sodium hydroxide, and hydrochloric acid and sodium nitrite were added to the mixture to carry out diazotization. Solution B was dropped to the diazo turbid liquid in the presence of sodium carbonate to complete a coupling reaction, whereby a reaction liquid was obtained. This reaction liquid was subjected to salting out with sodium chloride, and was then filtrated, whereby Compound D was obtained. 2-nitro-4-cresol, toluene, and potassium hydroxide were added to N,N-dimethylformamide, water was removed by azeotropic distillation with toluene, and propane sultone was dropped to the resultant product. After that, sodium hydroxide was added to the resultant product, followed by concentration. After that, in an autoclave, palladium carbon was added to the concentrate, and hydrogen gas was enclosed, whereby a solution was obtained. Hydrochloric acid and sodium nitrite were added to the solution to carry out diazotization. Reaction Liquid C obtained in the foregoing was dropped in the resultant product to complete coupling reaction in the presence of sodium hydroxide, whereby a reaction liquid was obtained. Hydrochloric acid and sodium nitrite were added to this reaction liquid to carry out diazotization. The diazo turbid liquid was added to an aqueous solution of Compound D to complete a coupling reaction. The resultant product was subjected to salting out with sodium chloride, and was then filtrated and washed, whereby Exemplified Compound Bk1 was obtained.

Compound (3)

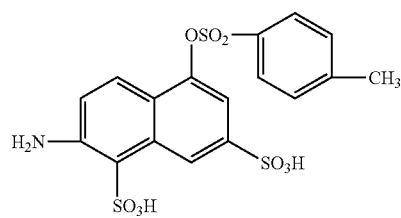

(Synthesis of Exemplified Compound C1)

(1) Synthesis of Tetrasodium Copper Phthalocyanine Tetrasulfonate (Compound (4))

Compound (4)

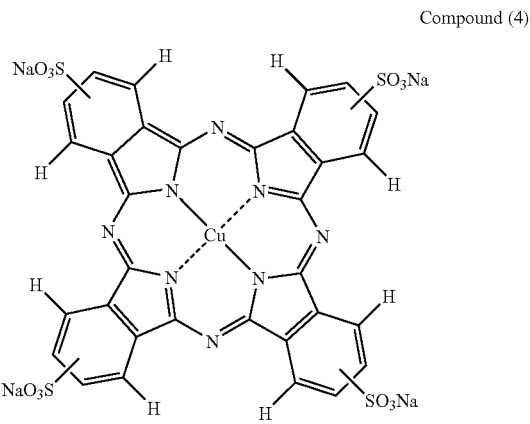

Sulfolane, monosodium 4-sulfophthalate, ammonium chloride, urea, ammonium molybdate, and copper (II) chloride were mixed, stirred, and washed with methanol. After that, water was added to the resultant product, and an aqueous solution of sodium hydroxide was used to adjust the pH of the solution to 11. An aqueous solution of hydrochloric acid was added to the resultant solution under stirring, and then sodium chloride was gradually added to precipitate crystals. The resultant crystals were filtered and washed with a 20% aqueous solution of sodium chloride, and then methanol was added. The precipitated crystals were filtered, washed with a 70% aqueous solution of methanol, and dried to prepare tetrasodium copper phthalocyanine tetrasulfonate as blue crystals.

Exemplified Compound 3k2

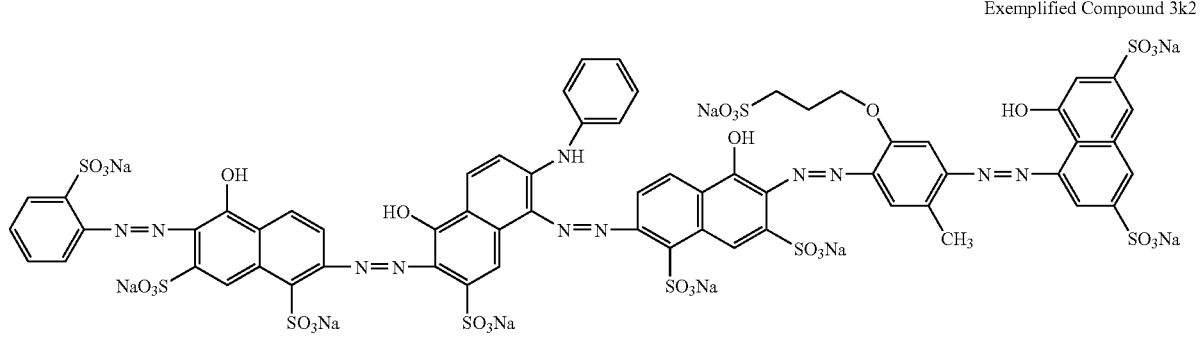

(2) Synthesis of Copper Phthalocyanine Tetrasulfonic Chloride (Compound (5))

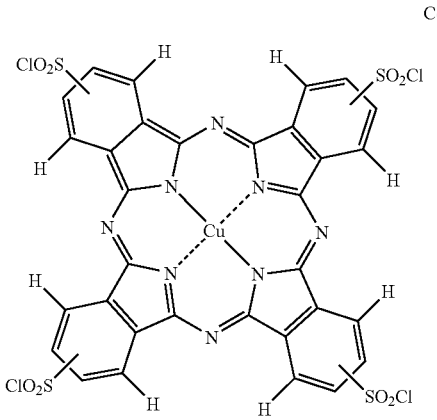

Compound (5)

Tetrasodium copper phthalocyanine tetrasulfonate (Compound (4)) obtained in the above was gradually added to chlorosulfonic acid, and then thionyl chloride was added dropwise to perform reaction. After that, the reaction solution was cooled, and the precipitated crystals were filtered to prepare a wet cake of copper phthalocyanine tetrasulfonic chloride.

(3) Synthesis of the Following Compound (6)

A compound (6) is a compound represented by the general formula (V) in which Y represents an amino group and $R_1$ and $R_2$ each independently represent a sulfonic group substituted at the 2-position or 5-position.

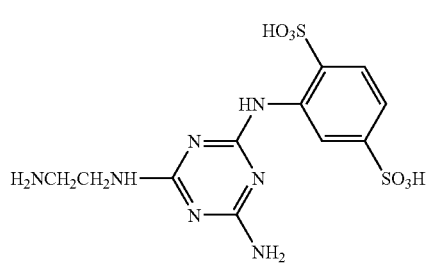

Compound (6)

Lipal OH, cyanuric chloride, and monosodium aniline-2, 5-disulfonate were added in an ice bath, and was allowed to react while an aqueous solution of sodium hydroxide was added. Next, an aqueous solution of sodium hydroxide was added to the reaction solution to adjust the pH of the reaction solution to 10.28% ammonia water and ethylenediamine were added to the reaction solution to perform reaction. Sodium chloride and concentrated hydrochloric acid were added to the resultant reaction solution to precipitate crystals. The precipitated crystals were filtered and batched off, and was washed with a 20% aqueous solution of sodium chloride to prepare a wet cake. Methanol and water were added to the resultant wet cake, and was filtered, washed with methanol, and dried to produce the compound (6).

(4) Synthesis of Exemplified Compound C1

The wet cake of copper phthalocyanine tetrasulfonic chloride (Compound (5)) synthesized in the above (2) was added to an ice bath, and was stirred to prepare a suspension. Ammonia water and the compound (6) synthesized in the above (3) were added to the suspension to perform reaction, and thereto, water and sodium chloride were added to the mixture to precipitate crystals. The resultant crystals were filtered, washed with an aqueous solution of sodium chloride, filtered again, washed, and dried to prepare the Exemplified Compound C1 as blue crystals. In view of the above reaction, the compound is estimated to be a coloring material which is a compound represented by Exemplified Compound C1 and has the average numbers of substituents in the general formula (IV) of l=0, m=1.0 to 2.0, and n=2.0 to 3.0.

(Preparation of Reactive Ink)

The respective components shown in Table 3 below were mixed and sufficiently stirred. After that, the resultant product was filtered through a microfilter having a pore size of 0.2 μm under pressure to prepare each of Reactive Inks 1 to 10.

TABLE 3

| | Reactive ink | | | | | | | | | |
|---|---|---|---|---|---|---|---|---|---|---|
| | 1 | 2 | 3 | 4 | 5 | 6 | 7 | 8 | 9 | 10 |
| Exemplified Compound M1 | | | | | 6.0 | 6.0 | 6.0 | 6.0 | | |
| Magenta coloring material (*1) | 6.0 | 6.0 | 6.0 | | | | | | | |
| Exemplified Compound Bk1 | | | | 1.2 | | | | | | |
| Exemplified Compound Bk2 | | | | 2.4 | | | | | | |
| C.I. Direct Orange 132 | | | | 1.4 | | | | | | |
| Exemplified Compound C1 | | | | | | | | | 6.0 | |
| C.I. Acid Yellow 23 | | | | | | | | | | 2.0 |
| Glycerin | 7.0 | 7.0 | 7.0 | 7.0 | 7.0 | 7.0 | 7.0 | 7.0 | 7.0 | |
| Ethylene glycol | 7.0 | 7.0 | 7.0 | 7.0 | 7.0 | 7.0 | 7.0 | 7.0 | 7.0 | |
| 1,5-pentanediol | 3.0 | 5.0 | 7.0 | 7.0 | | 5.0 | 7.0 | 9.0 | | |
| (2-(2-butoxyethoxy)ethanol) | | | | | | | | | | 15.0 |
| Magnesium nitrate hexahydrate | | | | | | | | | 1.0 | |
| Calcium nitrate | | | | | | | | | | 10.0 |

TABLE 3-continued

| | Reactive ink | | | | | | | | | |
|---|---|---|---|---|---|---|---|---|---|---|
| | 1 | 2 | 3 | 4 | 5 | 6 | 7 | 8 | 9 | 10 |
| Acetylenol E100 (*2) | 0.4 | 0.4 | 0.4 | 0.4 | 0.3 | 0.6 | 0.60 | 0.6 | 0.4 | 0.3 |
| Pure water | 76.6 | 74.6 | 72.6 | 73.6 | 79.7 | 74.4 | 72.4 | 70.4 | 78.6 | 72.7 |

(*1) Compound (7) shown below
(*2) Ethylene oxide adduct of acetylene glycol (surfactant; manufactured by Kawaken Fine Chemicals Co., Ltd.)
(*3) Ink 10 corresponds to Ink Composition 2 in Examples of Japanese Patent No. 2,889,817.

Compound (7)

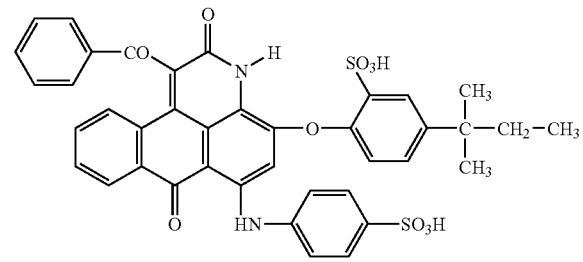

(Evaluation)

An ink cartridge for a BJF 870 manufactured by Canon Inc. was filled with each of Reactive Inks 1 to 10 obtained in the foregoing. After that, the ink cartridge and an ink cartridge filled with a pigment ink were mounted on a modified apparatus of an ink jet recording apparatus BJF 870 (manufactured by Canon Inc.). In the ink jet recording apparatus, an ejection orifice for a pigment ink and an ejection orifice for a reactive ink are capped with the identical cap. In addition, the ink jet recording apparatus has a suction pump as a unit for removing an ink in a cap by reducing the pressure in the cap, and can remove the ink in the cap by performing sucking operation. Further, the cap includes a member for absorbing an ink in itself. A recording medium (product name: Office Planner; manufactured by Canon Inc.) of A4 size was used as a recording medium. The term "100% duty of a solid image formed by using an ink jet recording apparatus BJF 870" means that four ink droplets each having a volume of 4.5 pl are applied to 600 dpi×600 dpi.

(Measurement of Mixed Thickening Ratio)

A value of a mixed thickening ratio Y was determined as described below by combining the pigment ink and the respective reactive inks obtained in the foregoing. First, the viscosities of the pigment ink and the reactive inks were measured. Then, the pigment ink and any one of the reactive inks were mixed in equal volumes, and stirred for 30 minutes. After that, the viscosity of the mixed ink was measured. A value of a mixed thickening ratio was determined from the measured value of the viscosity on the basis of the following equation. Viscosity was measured with a VISCONIC ED type (manufactured by Tokyo Keiki Co., Ltd.) under the condition that temperature was 25° C. Tables 2 and 5 show resultant values of mixed thickening ratios.

Mixed thickening ratio [%]=[(Viscosity of mixed ink−Average viscosity of Ink $A$ and Ink $B$)/(Average viscosity of Ink $A$ and Ink $B$)]×100

(Relationship Between Sucking Operation and Reliability)

Figure 7:
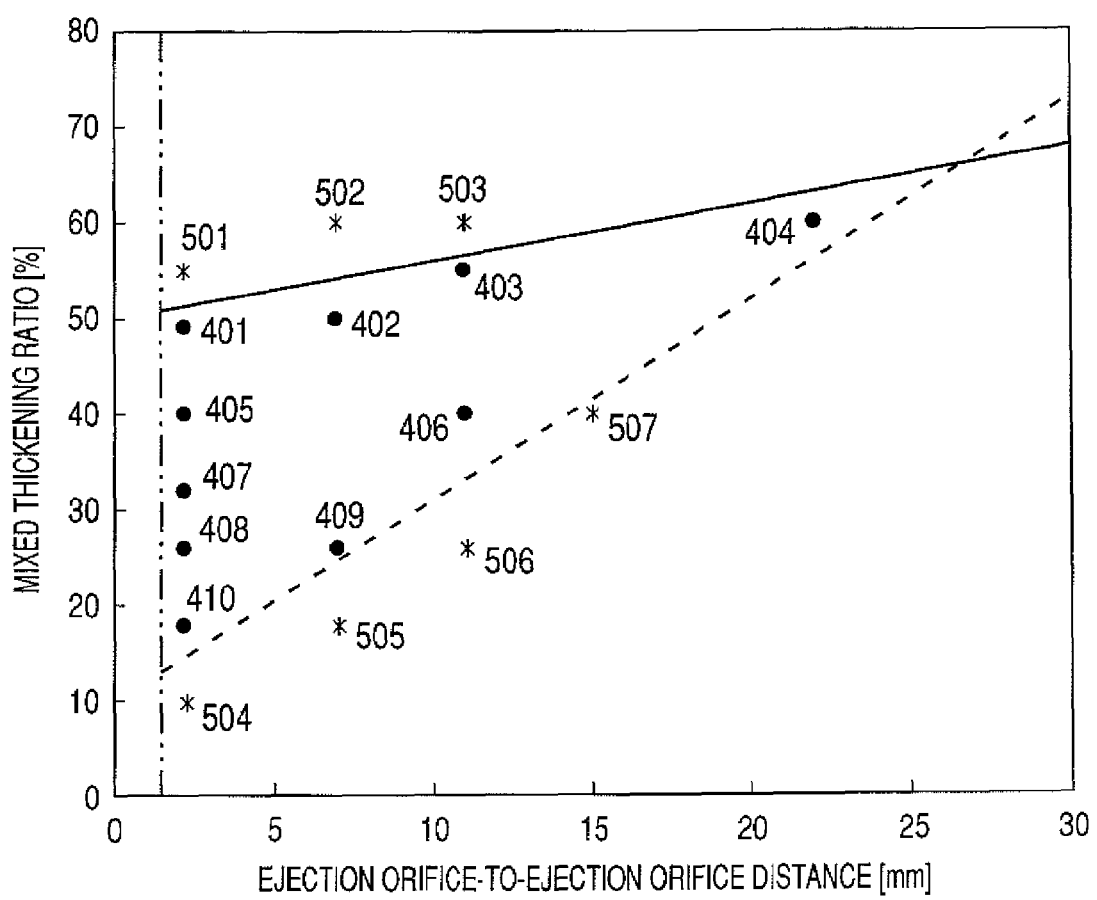
FIG. 7 is a graph showing the relationship between the mixed thickening ratio and the ejection orifice-to-ejection orifice distance in the pigment ink and reactive ink in Examples 1 to 18 and Comparative Examples 1 to 13.

First, evaluation for reliability depending on the presence or absence of a sucking mechanism was performed. The graph of FIG. 7 shows the relationship between a mixed thickening ratio and an ejection orifice-to-ejection orifice distance in the pigment ink and reactive ink of each of Examples 1 to 4 and Comparative Examples 1 to 10.

(Reliability)

An image was formed on the entire surface of the above-mentioned recording medium by applying the pigment ink having a duty of 150% and a reactive ink having a duty of 25% so that the inks would overlap each other. Upon formation of the image, the reactive ink and the pigment ink in this order were applied to the recording medium. Then, an ejection orifice for the pigment ink and an ejection orifice for the reactive ink were capped with the identical cap and left standing for 6 hours. After that, in the case of each of Examples 1 to 4 and Comparative Examples 5 to 7, a nozzle check pattern for the BJF 870 was recorded after a sucking operation had been performed. In addition, in the case of each of Comparative Examples 1 to 4 and 8 to 10, the nozzle check pattern was recorded without performing sucking operation. The resultant nozzle check pattern was visually observed and evaluated. Evaluation criteria for reliability are as shown below. Table 4 shows the results of the evaluation.

A: Neither non-ejection nor dot misalignment occurs.
C: Non-ejection or dot misalignment is remarkable.

TABLE 4

| | Reactive ink | Mixed thickening ratio Y [%] | Ejection orifice-to-ejection orifice distance X [mm] | Sucking operation | Reliability |
|---|---|---|---|---|---|
| Example 1 | 6 | 49.0 | 2.2 | Present | A |
| 2 | 6 | 49.0 | 7.0 | Present | A |
| 3 | 7 | 55.0 | 11.0 | Present | A |
| 4 | 8 | 60.0 | 22.0 | Present | A |
| Comparative example 1 | 6 | 49.0 | 2.2 | Absent | C |
| 2 | 6 | 49.0 | 7.0 | Absent | C |
| 3 | 7 | 55.0 | 11.0 | Absent | C |
| 4 | 8 | 60.0 | 22.0 | Absent | C |
| 5 | 7 | 55.0 | 2.2 | Present | C |
| 6 | 8 | 60.0 | 7.0 | Present | C |
| 7 | 8 | 60.0 | 11.0 | Present | C |
| 8 | 7 | 55.0 | 2.2 | Absent | C |
| 9 | 8 | 60.0 | 7.0 | Absent | C |
| 10 | 8 | 60.0 | 11.0 | Absent | C |

(Evaluation when Sucking Operation is Performed)

Next, evaluation for reliability, image quality, bleeding resistance, and color tone when a sucking operation was performed was made. The graph of FIG. 7 shows the relationship between a mixed thickening ratio and an ejection orificeto-ejection orifice distance in the pigment ink and reactive ink of each of Examples 5 to 18 and Comparative Examples 11 to 15. In FIG. 7, reference character 401 represents a point showing the relationship between an ejection orifice-to-ejection orifice distance and a mixed thickening ratio in each of Examples 1 and 5 and Comparative Example 1; 402, a point showing the relationship between an ejection orifice-to-ejection orifice distance and a mixed thickening ratio in each of Examples 2 and 6 and Comparative Example 2; 403, a point showing the relationship between an ejection orifice-to-ejection orifice distance and a mixed thickening ratio in each of Examples 3 and 7 and Comparative Example 3; 404, a point showing the relationship between an ejection orifice-to-ejection orifice distance and a mixed thickening ratio in each of Examples 4 and 8 and Comparative Example 4; 405, a point showing the relationship between an ejection orifice-to-ejection orifice distance and a mixed thickening ratio in Example 9; 406, a point showing the relationship between an ejection orifice-to-ejection orifice distance and a mixed thickening ratio in Example 10; 407, a point showing the relationship between an ejection orifice-to-ejection orifice distance and a mixed thickening ratio in Example 11; 408, a point showing the relationship between an ejection orifice-to-ejection orifice distance and a mixed thickening ratio in Example 12; 409, a point showing the relationship between an ejection orifice-to-ejection orifice distance and a mixed thickening ratio in Example 13; 410, a point showing the relationship between an ejection orifice-to-ejection orifice distance and a mixed thickening ratio in Example 14; 501, a point showing the relationship between an ejection orifice-to-ejection orifice distance and a mixed thickening ratio in each of Comparative Examples 5, 8 and 11; 502, a point showing the relationship between an ejection orifice-to-ejection orifice distance and a mixed thickening ratio in each of Comparative Examples 6, 9 and 12; 503, a point showing the relationship between an ejection orifice-to-ejection orifice distance and a mixed thickening ratio in each of Comparative Examples 7, 10 and 13; 504, a point showing the relationship between an ejection orifice-to-ejection orifice distance and a mixed thickening ratio in Example 15; 505, a point showing the relationship between an ejection orifice-to-ejection orifice distance and a mixed thickening ratio in Example 16; 506, a point showing the relationship between an ejection orifice-to-ejection orifice distance and a mixed thickening ratio in Example 17; and 507, a point showing the relationship between an ejection orifice-to-ejection orifice distance and a mixed thickening ratio in Example 18.

(Reliability)

An image was formed on the entire surface of the above-mentioned recording medium by applying the pigment ink having a duty of 150% and a reactive ink having a duty of 25% so that the inks would overlap each other. Upon formation of the image, the reactive ink and the pigment ink in this order were applied to the recording medium. After that, sucking operation was performed, and furthermore, the recording medium with the inks applied thereto was left standing for 1 hour. The foregoing cycle including recording, recovery, and leaving was repeated ten times. After that, the nozzle check pattern for the BJF 870 was recorded. The resultant nozzle check pattern was visually observed and evaluated. Evaluation criteria for reliability are as shown below. Table 5 shows the results of the evaluation.

A: Neither non-ejection nor dot misalignment occurs.

C: Non-ejection or dot misalignment is remarkable.

(Image Quality)

Image (1) in which the pigment ink having a duty of 150% and a reactive ink having a duty of 25% were applied so as to overlap each other and Image (2) in which the pigment ink having a duty of 150% was applied were formed on the above-mentioned recording medium. In Image (1), the pigment ink and the reactive ink in this order were applied to the recording medium. After the resultant images had been left standing for 1 day, the image density of each of Image (1) and Image (2) was visually observed and evaluated. Evaluation criteria for image quality are as shown below. Table 5 shows the results of the evaluation.

A: The image density of Image (1) is higher than that of Image (2).

B: The image density of Image (1) is comparable to that of Image (2).

C: The image density of Image (1) is less than that of Image (2).

(Bleeding Resistance)

A recording pattern in which an image to be formed from the pigment ink and an image to be formed from a reactive ink were adjacent to each other was formed on the above-mentioned recording medium. To be specific, the images were formed as follows: characters and ruled lines were each represented by using the pigment ink having a duty of 100%, and the background was represented by using the reactive ink having a duty of 50%. In this case, the reactive ink and the pigment ink in this order were applied to the recording medium. The degree of bleeding at boundary portions between the resultant images was visually observed and evaluated. Evaluation criteria for bleeding resistance are as shown below. Table 5 shows the results of the evaluation.

A: No bleeding occurs at boundary portions.

B: Slight bleeding occurs at boundary portions.

C: Considerable bleeding occurs at boundary portions.

(Color Tone)

Image (1) in which the pigment ink having a duty of 150% and a reactive ink having a duty of 25% were applied so as to overlap each other and Image (2) in which only the pigment ink having a duty of 150% was applied were formed on the above-mentioned recording medium. In Image (1), the reactive ink and the pigment ink in this order were applied to the recording medium. the color tone of each of Image (1) and Image (2) was visually observed and evaluated. Evaluation criteria for color tone are as shown below. Table 5 shows the results of the evaluation.

A: Image (1) and Image (2) do not differ from each other in color tone.

B: Image (1) and Image (2) slightly differ from each other in color tone.

C: Image (1) and Image (2) considerably differ from each other in color tone.

TABLE 5

|  |  | Reactive ink | Mixed thickening ratio Y [%] | Ejection orifice-to-ejection orifice distance X [mm] | Sucking operation | Reliability | Image quality | Bleeding resistance | Color tone |
|---|---|---|---|---|---|---|---|---|---|
| Example | 5 | 6 | 49.0 | 2.2 | Present | A | A | A | B |
|  | 6 | 6 | 49.0 | 7.0 | Present | A | A | A | B |
|  | 7 | 7 | 55.0 | 11.0 | Present | A | A | A | B |
|  | 8 | 8 | 60.0 | 22.0 | Present | A | A | A | B |
|  | 9 | 5 | 40.0 | 2.2 | Present | A | A | A | B |
|  | 10 | 5 | 40.0 | 11.0 | Present | A | A | A | B |
|  | 11 | 4 | 32.0 | 2.2 | Present | A | A | A | A |
|  | 12 | 3 | 26.0 | 2.2 | Present | A | B | A | B |
|  | 13 | 3 | 26.0 | 7.0 | Present | A | B | A | B |
|  | 14 | 2 | 18.0 | 2.2 | Present | A | B | A | B |
|  | 15 | 1 | 10.0 | 2.2 | Present | A | C | C | B |
|  | 16 | 2 | 18.0 | 7.0 | Present | A | B | C | B |
|  | 17 | 3 | 26.0 | 11.0 | Present | A | B | C | B |
|  | 18 | 5 | 40.0 | 15.0 | Present | A | A | C | B |
| Comparative example | 11 | 7 | 55.0 | 2.2 | Present | C | A | A | B |
|  | 12 | 8 | 60.0 | 7.0 | Present | C | A | A | B |
|  | 13 | 8 | 60.0 | 11.0 | Present | C | A | A | B |
|  | 14 | 9 | 100 or more | 15.0 | Present | C | A | A | B |
|  | 15 | 10 | 100 or more | 15.0 | Present | C | A | A | B |

(Evaluation when Two Types of Reactive Inks are Used)

Next, evaluation for image quality and bi-directional unevenness when two types of reactive inks were used was made. Reactive Ink 4 was used as a weakly reactive ink, and Reactive Ink 9 was used as a strongly reactive ink. An ejection orifice-to-ejection orifice distance between ejection orifices for the pigment ink and the weakly reactive ink was set to be 1.7 mm, and an ejection orifice-to-ejection orifice distance between ejection orifices for the pigment ink and the strongly reactive ink was set to be 16 mm. The BJF 870 (manufactured by Canon Inc.) modified in the same manner as in the above was used as an ink jet recording apparatus. In this case, the ejection orifice for the weakly reactive ink and the ejection orifice for the pigment ink were capped with the identical cap, and the ejection orifice for the strongly reactive ink and the ejection orifice for the pigment ink were capped with different caps. In addition, the same recording medium (product name: Office Planner; manufactured by Canon Inc.) of A4 size as described above was used as a recording medium.

The order in which the respective inks were applied to the recording medium was set by setting an ejection orifice for each ink as described below. When a recording head having a constitution shown in FIG. 13 was used, the ejection orifice for the pigment ink corresponded to reference character 31, the ejection orifice for the weakly reactive ink corresponded to reference character 32, and the ejection orifice for the strongly reactive ink corresponded to reference character 33. In addition, when a recording head having a constitution shown in FIG. 14 was used, the ejection orifice for the weakly reactive ink corresponded to reference character 34, the ejection orifice for the pigment ink corresponded to reference character 35, and the ejection orifice for the strongly reactive ink corresponded to reference character 36.

(Image Quality)

Image (1) in each of Examples 19 to 22 was formed on the above-mentioned recording medium where the pigment ink having a duty of 150% and the respective reactive inks each having a duty of 25% were applied in the order shown in Table 6 so as to overlap one another. In addition, for comparison, Image (2) was formed on the above-mentioned recording medium where the pigment ink having a duty of 150% and Reactive Ink 3 having a duty of 25% were applied so as to overlap each other. Upon formation of Image (2), the pigment ink and Reactive Ink 3 in this order were applied to the recording medium in the forward recording of a recording pass. The image density of Image (1) of each of Examples 19 to 22 formed by using two types of reactive inks and the image density of Image (2) formed by using one type of a reactive ink was visually observed and evaluated. Evaluation criteria for image quality are as shown below. Table 6 shows the results of the evaluation.

A: The image density of Image (1) is higher than that of Image (2).

C: The image density of Image (1) is comparable to or less than that of Image (2).

TABLE 6

Figure 13:
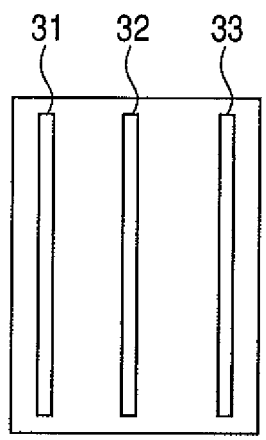
FIG. 13 is a view showing ejection orifice lines for a pigment ink and respective reactive inks in Examples 19, 20, and 23.
Figure 14:
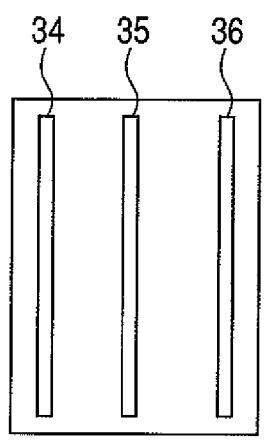
FIG. 14 is a view showing ejection orifice lines for a pigment ink and respective reactive inks in each of Examples 21, 22, and 24.

|  |  | Head constitution | Recording pass | Order in which inks are applied | | | Image quality |
|---|---|---|---|---|---|---|---|
|  |  |  |  | First | Second | Third |  |
| Example | 19 | FIG. 13 | Forward | Pigment ink | Weakly reactive ink | Strongly reactive ink | A |
|  | 20 | FIG. 13 | Backward | Strongly reactive ink | Weakly reactive ink | Pigment ink | A |
|  | 21 | FIG. 14 | Forward | Weakly reactive ink | Pigment ink | Strongly reactive ink | A |

TABLE 6-continued

| | Head constitution | Recording pass | Order in which inks are applied | | | Image quality |
|---|---|---|---|---|---|---|
| | | | First | Second | Third | |
| 22 | FIG. 14 | Backward | Strongly reactive ink | Pigment ink | Weakly reactive ink | A |

(Bi-Directional Unevenness)

An image in each of Examples 23 and 24 was formed on the above-mentioned recording medium where the pigment ink having a duty of 150% and the respective reactive inks each having a duty of 25% were applied in the order shown in Table 7 so as to overlap one another. When a recording head having a constitution shown in FIG. 13 was used, Image (1) formed by applying the pigment ink, the weakly reactive ink and the strongly reactive ink in this order, and Image (2) formed by applying the strongly reactive ink, the weakly reactive ink, and the pigment ink in this order were compared with each other. In addition, when a recording head having a constitution shown in FIG. 14 was used, Image (3) formed by applying the weakly reactive ink, the pigment ink and the strongly reactive ink in the stated order, and Image (4) formed by applying the strongly reactive ink, the pigment ink and the weakly reactive ink in this order were compared with each other. Bi-directional unevenness in each of the images obtained in the forward recording and backward recording by using a recording head having a constitution shown in FIG. 13 or 14 was visually observed and evaluated. Evaluation criteria for bi-directional unevenness are as shown below. Table 7 shows the results of the evaluation.

A: No bi-directional unevenness occurs.
B: Slight bi-directional unevenness occurs.
C: Considerable bi-directional unevenness occurs.

TABLE 7

| | | Head constitution | Recording pass | Order in which inks are applied | | | Bi-directional unevenness |
|---|---|---|---|---|---|---|---|
| | | | | First | Second | Third | |
| Example | 23 | FIG. 13 | Forward | Pigment ink | Weakly reactive ink | Strongly reactive ink | B |
| | | | Backward | Strongly reactive ink | Weakly reactive ink | Pigment ink | |
| | 24 | FIG. 14 | Forward | Weakly reactive ink | Pigment ink | Strongly reactive ink | A |
| | | | Backward | Strongly reactive ink | Pigment ink | Weakly reactive ink | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-064315, filed Mar. 9, 2006, which is hereby incorporated by reference herein in its entirety.

What is claimed is:

1. A pigment ink for use in an ink jet recording apparatus in which ejection orifices for a pigment ink and ejection orifices for at least one type of reactive ink that destabilizes a dispersed state of pigment in the pigment ink are capped with an identical cap provided with a unit for removing an ink in the cap, wherein, when a mixed thickening ratio upon mixing the pigment ink and the reactive ink in equal volumes is represented by Y (%) and an ejection orifice-to-ejection orifice distance between the ejection orifice for the pigment ink and the ejection orifice for the reactive ink is represented by X (mm), provided that X>0, then Y and X in the pigment ink and the reactive ink the ejection orifices for which are capped with the identical cap satisfy a relationship represented by the following expression (A):

$$Y \leq 0.60X + 50.0 \quad (A).$$

2. A pigment ink according to claim 1, wherein the unit for removing the ink in the cap comprises a unit for removing an ink in the cap by using a suction pump to reduce pressure in the cap.

3. A pigment ink according to claim 1, wherein the cap includes a member for absorbing an ink in the cap.

4. A pigment ink according to claim 1, wherein Y and X in the pigment ink and the reactive ink the ejection orifices for which are capped with the identical cap additionally satisfy relationships represented by the following expressions (1) and (2):

$$X \geq 1.5 \quad (1)$$

$$Y \geq 2.1X + 10.0 \quad (2).$$

5. A pigment ink according to claim 1, wherein the reactive ink comprises plural reactive inks different from each other in mixed thickening ratio, and wherein the ejection orifice for the pigment ink and an ejection orifice for a reactive ink having a smallest mixed thickening ratio of the plural reactive inks different from each other in mixed thickening ratio are capped with the identical cap.

6. A pigment ink according to claim 5, wherein the ejection orifice for the pigment ink is interposed between respective ejection orifices for the plural reactive inks different from each other in mixed thickening ratio.

7. A pigment ink according to claim 6, wherein at least one type of reactive ink of the plural reactive inks different from each other in mixed thickening ratio has the same hue as at least one type of pigment ink, and the other reactive inks have hues different from the at least one type of pigment ink, and
wherein the pigment ink is used together with an ink having a hue different from the at least one type of pigment ink and the plural reactive inks different from each other in mixed thickening ratio.

8. An ink set comprising plural inks, wherein the plural inks comprise at least the pigment ink and a reactive ink according to claim 1.

9. An ink jet recording method comprising ejecting an ink by an ink jet method to perform recording, wherein the ink comprises the pigment ink according to claim 1.

10. An ink cartridge comprising an ink storage portion for storing an ink, wherein the ink comprises the pigment ink according to claim 1.

11. An image forming method comprising performing recording by using a pigment ink and at least one type of reactive ink that destabilizes a dispersed state of pigment in the pigment ink according to an ink jet recording method,
wherein the pigment ink according to claim 1 is used as the pigment ink, and
wherein an image is formed including an image formed from the pigment ink and an image formed from the reactive ink which are adjacent to each other.

12. A recording unit comprising ink storage portions for storing inks and a recording head for ejecting the inks,
wherein the inks comprise a pigment ink and at least one type of reactive ink that destabilizes a dispersed state of pigment in the pigment ink,
wherein ejection orifices for the pigment ink and ejection orifices for the reactive ink are capped with an identical cap provided with a unit for removing an ink in the cap, and
wherein when a mixed thickening ratio upon mixing the pigment ink and the reactive ink in equal volumes is represented by Y (%) and an ejection orifice-to-ejection orifice distance between the ejection orifice for the pigment ink and the ejection orifice for the reactive ink is represented by X (mm), provided that X>0, then Y and X in the pigment ink and the reactive ink the ejection orifices for which are capped with the identical cap satisfy a relationship represented by the following expression (A):

$$Y \leq 0.60X + 50.0 \qquad (A).$$

13. An ink jet recording apparatus in which ejection orifices for a pigment ink and ejection orifices for at least one type of reactive ink that destabilizes a dispersed state of a pigment in the pigment ink are capped with an identical cap, and the cap comprises a unit for removing an ink in the cap,
wherein, when a mixed thickening ratio upon mixing the pigment ink and the reactive ink in equal volumes is represented by Y (%) and an ejection orifice-to-ejection orifice distance between the ejection orifice for the pigment ink and the ejection orifice for the reactive ink is represented by X (mm), provided that X>0, then Y and X in the pigment ink and the reactive ink the ejection orifices for which are capped with the identical cap satisfy a relationship represented by the following expression (A):

$$Y \leq 0.60X + 50.0 \qquad (A).$$

14. An image forming method comprising ejecting a pigment ink, ejecting at least one type of reactive ink that destabilizes a dispersed state of pigment in the pigment ink, and capping ejection orifices for the pigment ink and ejection orifices for the reactive ink with an identical cap to remove ink in the cap,
wherein, when a mixed thickening ratio upon mixing the pigment ink and the reactive ink in equal volumes is represented by Y (%) and an ejection orifice-to-ejection orifice distance between the ejection orifice for the pigment ink and the ejection orifice for the reactive ink is represented by X (mm), provided that X>0, then Y and X in the pigment ink and the reactive ink the ejection orifices for which are capped with the identical cap satisfy a relationship represented by the following expression (A):

$$Y \leq 0.60X + 50.0 \qquad (A).$$

* * * * *